US010534806B2

(12) United States Patent
Stoddard, II et al.

(10) Patent No.: US 10,534,806 B2
(45) Date of Patent: Jan. 14, 2020

(54) SYSTEM AND METHOD FOR ORGANIZING ARTISTIC MEDIA BASED ON COGNITIVE ASSOCIATIONS WITH PERSONAL MEMORIES

(71) Applicant: Life Music Integration, LLC, Philadelphia, PA (US)

(72) Inventors: Frederick Rhode Stoddard, II, Philadelphia, PA (US); Elena del Busto, Philadelphia, PA (US)

(*) Notice: Subject to any disclaimer, the term of this patent is extended or adjusted under 35 U.S.C. 154(b) by 465 days.

(21) Appl. No.: 14/721,757

(22) Filed: May 26, 2015

(65) Prior Publication Data
US 2015/0339300 A1 Nov. 26, 2015

Related U.S. Application Data

(60) Provisional application No. 62/002,411, filed on May 23, 2014.

(51) Int. Cl.
*G06F 16/438* (2019.01)
*G06F 16/48* (2019.01)
*G06Q 50/00* (2012.01)
*G06F 16/44* (2019.01)

(52) U.S. Cl.
CPC .......... *G06F 16/4393* (2019.01); *G06F 16/48* (2019.01)

(58) Field of Classification Search
CPC ......... G06F 17/30761; G06F 17/30056; G06F 17/30038; G06F 16/4393; G06F 16/48; G06F 17/00; G06F 16/44; G06Q 50/01
USPC ....... 715/716, 753, 201, 202, 727, 748, 760, 715/764, 810, 854; 707/E17.009, 707/E17.014, 740, 722, E17.046, 737, 707/769, E17.019, E17.03, E17.089, 707/E17.09, E17.101, E17.108, 705, 728, 707/736, 748, 754, 758, 780, 802, 707/999.003, 999.005, 999.103
See application file for complete search history.

(56) References Cited

U.S. PATENT DOCUMENTS

| 7,368,652 | B2 | 5/2008 | Iketani et al. |
| 7,786,369 | B2 | 8/2010 | Eom et al. |
| 7,788,279 | B2 | 8/2010 | Mohajer et al. |

(Continued)

OTHER PUBLICATIONS

PCT Notification of Transmittal of International Preliminary Report on Patentability for PCT/US15/32447 dated Apr. 7, 2016.

(Continued)

*Primary Examiner* — Jay A Morrison
*Assistant Examiner* — Ken Hoang
(74) *Attorney, Agent, or Firm* — Carter, DeLuca & Farrell LLP

(57) ABSTRACT

A system and method for cognitive media association including a tracking unit configured to track an output of media over time for a particular user and create a list of the output media for the particular user, a link generation unit configured to generate a link between the media and at least one of a person, a place, an event, an era, an emotion, a theme, a photo, a video, or a social media post, an events recording unit configured to create a comprehensive experience of a specific event including at least one of music played at the specific event, photos displayed at the specific event, videos played at the specific event, social media posts about the event, people present at the specific event, or any combinations thereof.

16 Claims, 16 Drawing Sheets

(56) References Cited

U.S. PATENT DOCUMENTS

| | | |
|---|---|---|
| 7,886,045 B2 * | 2/2011 | Bates .............. H04L 67/12 709/224 |
| 7,921,369 B2 | 4/2011 | Bill |
| 8,229,935 B2 | 7/2012 | Lee et al. |
| 8,260,656 B1 | 9/2012 | Harbick et al. |
| 8,429,181 B2 | 4/2013 | Gutstadt et al. |
| 8,468,046 B2 | 6/2013 | Harbick et al. |
| 8,650,094 B2 | 2/2014 | Cai et al. |
| 8,843,316 B2 | 9/2014 | Martin et al. |
| 9,600,720 B1 * | 3/2017 | Gray .............. G06F 17/30244 |
| 9,665,616 B2 * | 5/2017 | Pickersgill ........ G06F 17/30424 |
| 2002/0097277 A1 | 7/2002 | Pitroda |
| 2002/0151992 A1 | 10/2002 | Hoffberg et al. |
| 2006/0065105 A1 | 3/2006 | Iketani et al. |
| 2009/0128335 A1 | 5/2009 | Leung |
| 2009/0164601 A1 * | 6/2009 | Swartz .............. G06Q 30/02 709/217 |
| 2010/0191037 A1 | 7/2010 | Cohen et al. |
| 2011/0106827 A1 | 5/2011 | Gutstadt et al. |
| 2011/0295843 A1 * | 12/2011 | Ingrassia, Jr. ..... G06F 17/30053 707/723 |
| 2012/0016678 A1 | 1/2012 | Gruber et al. |
| 2012/0233000 A1 * | 9/2012 | Fisher .............. G06Q 30/02 705/14.71 |
| 2012/0233164 A1 | 9/2012 | Rowe et al. |
| 2013/0198633 A1 | 8/2013 | Hyman |
| 2013/0254065 A1 | 9/2013 | Harbick et al. |
| 2013/0283303 A1 | 10/2013 | Moon et al. |
| 2014/0337346 A1 * | 11/2014 | Barthel ............ G06F 17/30899 707/738 |
| 2015/0134371 A1 * | 5/2015 | Shivakumar ........ G06Q 10/02 705/5 |

OTHER PUBLICATIONS

PCT Search Report and Written Opinion for Appln. No. PCT/US15/32447 dated Sep. 3, 2015.

* cited by examiner

SYSTEM AND METHOD FOR ORGANIZING ARTISTIC MEDIA BASED ON COGNITIVE ASSOCIATIONS WITH PERSONAL MEMORIES

PRIORITY

The present application claims the benefit of and priority to U.S. Provisional Application Ser. No. 62/002,411 filed on May 23, 2014, the entire contents of which being incorporated by reference herein.

TECHNICAL FIELD

The present disclosure relates to a system and method for digitally duplicating cognitive links between audio/visual media and a listener's personal experiences allowing for efficient organization and retrieval of this information and providing a system for playing said media in a manner which allows for users on different playing devices on the same or different networks to view or listen to said media simultaneously in real-time.

BACKGROUND

Art functions as a reflection of our thoughts, our feeling, and our emotions. It can embody a specific time in our lives and the relationships we experience during that time. The human mind automatically makes associations between art (audio or visual) and personal experiences or memories. For the purposes of this description, any association between a piece of art and memory may be referred to as a "cognitive link". Such memories include, but are not limited to, people, places, events, periods of time, thought and feelings. These cognitive links mutually impact both human memory on one side of the link and the enjoyment of art on the other side of the link. As such:

Art can trigger personal and sentimental thoughts and memories that enhance the enjoyment of said art by intensifying its emotional impact.

Personal and sentimental thoughts and memories can trigger the remembrance of specific pieces of art that in turn can further enhance and stimulate memories associated with said art.

For example, hearing a specific piece of music might remind you of a time when you heard the song with your spouse thus eliciting a feeling of love and warmth. These feelings in turn will give sentimental importance to the music thus intensifying the enjoyment of the listening experience. As another example, while remembering an important event in your life you may remember hearing a specific song being played. By listening to the song, you can further stimulate memories of where you were and what you were doing while that song was playing in that specific event. Listening to other songs played during that time may help to stimulate other memories not appreciated otherwise. These cognitive links can be so strong as to last a lifetime. However, while the human mind innately makes these cognitive links between life and art, it is largely inefficient at retrieving them in a clear and well-organized fashion. These links remain largely in our subconscious, only surfacing when stimulated by a piece of art or a specific memory. These links are strong though and can remain even after a memory has faded completely from our conscious minds. It is not uncommon to hear a song and be reminded of a time long in the past.

Current technical systems for the organization artistic media utilize a hierarchical system based on attributes of the art itself such as genre, author, album, and song title for a piece of music. While such a system is convenient for easily looking for a specific of art, it fails to take into account emotional or sentimental effects on a listener, which is often the reason a user chooses specific pieces of music. As a result, while current systems facilitate organization, retrieval, and playing of individual pieces of art, they fail to directly facilitate or enhance the human mind's innate cognitive approach to art that gives art its sentimental impact.

Recent advancements in music analysis have focused on using elements of a song such as rhythm, tempo, and cadences to determine the general "mood" of a specific piece. This has been utilized as a means of recommending music based on matching the "mood" of a song with the "mood" of a listener, or alternatively, using the "mood" of a song contrary to that of the listener to help sway or change the "mood" of the listener. While this may function well when a song is heard for the first time, as a listener hears a song more frequently they automatically develop cognitive associates between the music and details of their personal life. Ultimately, the emotional impact of music goes deeper than technical elements; more important are those memories an individual associates with a specific piece. As such, an up-beat, "happy" song may remind a listener of a loved one who recently passed away. The emotions evoked from hearing that song may be intense sadness and loss (even though the song is considered a "happy" song). Years later, it may elicit a sense of sadness with component of nostalgia. Years later still, it may elicit a sense of happiness, reminding the listener of the good times they once had with their loved one. Hence, a single cognitive link between a song and a person may result in a wide variety of emotional responses that may change over time. Cognitive links will always supersede musical elements in eliciting emotional responses. Music therefore has its greatest impact when cognitive links are in emotional synchrony with the music's "mood".

The current method for bridging the gap between music- or mood-based, hierarchical organization of music and the personal, cognitive connections of music is the through the use of "playlists". Playlists in these regard are simple lists of songs that are jointly given a specific name. Playlist will often focus on a set of cognitive links to music so as to allow for easy retrieval of that music and its associated cognitive links. However, the "theme" or "cognitive link(s)" are fixed when the playlist is created. Playlists are ultimately limited to the finite list of songs that are added to them based on those songs that come to mind during the creation of the playlist or added post hoc. Any minor modification, deviation, or subcategorization of the theme requires the generation of an entirely new playlist. In addition, playlists become increasingly difficult to manage the longer they get and the more playlists an individual has. Ultimately, maintaining an extensive playlist library is difficult and tedious. Current efforts have focused on making it easier to create and modify playlists, however, this fails to solve the above issues.

Music is inherently a social phenomenon and tends to play an important role in social events. Music can help connect us to the people, the place, the feelings, etc., of the event. We experience events in our lives using all sensory modalities; similarly, events are best remembered when multiple sensory modalities can be re-experienced. Systems exist for recording photos, videos, comments, and thoughts about an event. Playlists can be generated to provide the music of an event. However, there are currently no systems which gather all the available data, between multiple attendees, into a single place and displays it in such a way as to allow for the comprehensive, multi-sensory experience of an event need for optimal re-experiencing of said event. Similarly, our memories of music, people, places, events, eras, etc. are also multisensory. There are currently no systems available for bringing together all our important memories and media about these into a single place and displaying them in such a way as to allow for the comprehensive, multi-sensory experience needed for optimal re-experiencing.

Another important humanistic element of art is that its enjoyment is enhanced when people experience art together. While radio is able to accomplish this, individual listeners have no control over what is played or when. While some new companies have developed ways of sharing playlists or artistic likes/dislikes, there is currently no means to experience personally generated art together across distances on different networks.

Various types of "radio" stations exist which play a variety of music selections. Music selections are primarily chosen completely by a third party, whether it is a person or selected at random based on a mathematical algorithms. An ideal algorithm would take into account the user's personal connection to music and specific attributes that the user finds appealing to allow for a very personalized music recommendation system. Additionally, having the ability to fine-tune the music selected by the algorithm to a listener's specific music needs at that moment in time is also ideal. However, current algorithms tend to be largely static. Algorithms may be focus on a single song, artists or a group of songs. Alternatively, algorithms may focus on attributes inherent to the music itself such as tempo, beat, cadence, etc. User input is almost exclusively limited to general likes and dislikes with the user providing "thumbs up" or "thumbs down". This ultimately results in a system that tries to predict what you might like based on attributes of songs that you tell the system you do like. However, this misses a critical piece of information—why exactly you like the songs that you like. A system that understands why you like a specific song will be more likely to successfully predict what you might like to hear next.

SUMMARY

The system and method according to the present disclosure are designed to digitally recreate cognitive links between art and its perceiver in such a way as to allow for permanent storage of said links and to facilitate their retrieval in a manner designed to enhance the enjoyment and sharing of art. While such a system and method could be used for all artistic media, the system and method of the present disclosure are described with respect to music as the primary example.

The systems described below may be embodied as a single component, or multiple components, of a device, or devices, which include software and hardware therewith. For example, the systems described below may include, or may be components of device(s) which include, With regard to music, the system and method according to the present disclosure chronicles the music that a user listens to throughout their life. Various techniques might be implemented in sequence or in parallel to this end. Songs might be added manually, dictated, identified through a music-recognition function, imported from a third party, or any other method. In this regard, the system and method will track the music the user listens to across time irrespective of the source. Any relevant data available at the time of song entry would also be recorded, including but not limited to time, locations, events, etc.

The system according to the present disclosure also provides for a unique method of linking songs to personal associations the user has to the music they listen too. These associations include, but are not limited to people, places, times, events, eras, feelings/emotions, and/or themes. Within the systems memory, each song and each specific association would maintain distinct locations heretofore referred to as the "music node" and the "association node" respectively. "Association Links" are used to connect the two. Nodes can be unique to an individual or shared between two or more users. "Association Nodes" can also be linked to other "Association Nodes". Maintaining distinct locations results in a network in which each "music node" could be linked to one or more "association nodes". Similarly, each "association node" could be linked to one or more "music nodes" and other "association nodes". Unique features emerge depending on which node is being analyzed.

The system according to the present disclosure also provides for a unique method of creating a comprehensive, multi-sensory experience of event. An "Event Timer" is present in the system. When activated, an "Event Node" is created and the start time recorded. Once activated, other users can be invited to the event in essence linking their account to the specified "Event Node". The system then uses audio identification to record all the songs played at the event. Other means of creating a list of songs from the event can also be implemented. All photos, videos, and social media comments generated by the users of the event would be linked to the "Event Node" in question. This will create a singular event node with all the music, photos, videos, and social media comments that can be easily accessed by the system for further use. When the "Event Timer" is stopped, the event is completed at which point the system stops adding links to the "Event Node" automatically. Users who are connected to the link can add associations at a later time as desired.

The system according to the present disclosure also provides for a method of sharing nodes between users. Nodes that are common to all users (such as songs) would be shared by all users. This is also true for common themes, feelings, and emotions. Other associations may also be shared be all users. Other nodes may be shared by a smaller, exclusive group based on invitation.

The system according to the present disclosure also provides for a unique method of analyzing and displaying data from a single "Song Node". "Association Nodes" linked the "Song Node" via personal links can be used to create a single page that displays all the relevant personal associations to a specific song. This includes, but is not limited to any person, place, time, event, era, theme, and/or feeling/emotion that are personally associated to the song in questions. This provides a comprehensive visual graphic of the role the song has played throughout the user's life. Alternatively, or in combination, the system could provide a timeline of when and how frequently the user listened to the song. Alternatively, or combination, the system could provide a map of the locations the song has been heard. Alternatively, or in combination, they system may use information about the frequency, timing, and location in which a song is played to suggest time periods during which a song might have been important to a user thus encouraging the user to bring to consciousness potential cognitive links. Through accessing personal information stored locally, externally, or through secondary programs, the system could recommend potential cognitive links for the song during that period of time. When a song is heard, having all the associations displayed in such a manner might deepen the personal connection to the song and/or remind the user of people, events, etc., that they wouldn't otherwise have thought about creating a sense of nostalgia in the user. Alternatively, or in combination, the user could choose to analyze links that are shared with others. This would provide the user with a list of common associations to a song. The user could use this feature to see what other users associate with a specific song.

The system according to the present disclosure also provides for a unique method of analyzing and displaying data from a single "Association Node". The user can generate lists of music by selecting one or more personal associations. Song(s) linked to the specific node or nodes would be returned. As an example, a user could make a list of songs that focus on a specific sentiment or feeling such as songs that "remind me of my wife" or songs "I like to work out to". If the user is in a particular mood, he could choose music to enhance the mood (i.e., select songs associated with "happy"), based on his own feelings about the music he listens to rather than generic mood music that he might not like or that he might not associate with the feelings in question. Alternatively, or in combination, the user could choose to focus on links that are shared with others. Given the large number of potential associations, various algorithms can be applied to organize the list. For example, each link could be given weight based on the number of individuals who have used a specific link. The more common the link, the stronger the weight and the higher on the list the song would be. Users could similarly choose multiple associations to create a more specific list of songs based on shared associations. As an example, the user could select "workout" and "happy" and would be provided a list of songs that are commonly associated with "workout" and "happy", in essence providing a list of "happy workout songs." Alternatively or in combination the system could display the related "association nodes" in a single page. As an example, by selecting "Person A" the user would be displayed all associated information about that person including but not limited to photos, shared events, feelings/emotions, locations shared, or personal information about the person (birthdate, age, etc.). Music associated with the person would also be included and could be played potentially providing an additional sensory modality, fortifying the emotional connection to the person, and enhancing memory recall of that person. As another example, this could be used to help stimulate memories of a specific event such as "songs played during my wedding" or "songs played during the company picnic in 2002." By being able to play all the songs heard during a specific event while simultaneously seeing photos, videos, and social media posts, the user or users could enhance his or their remembrance of the event through the memories associated with the music. Similar effects could be had for all other types of associations.

The system according to the present disclosure also provides for a unique method of playing and listening to music that allows for person A to be playing a song while person B (and C, D, etc.) listens in. Each person or user could text and/or chat while the music is playing, allowing further sharing during the listening process. The person streaming could choose to share the associations they have with the music they are listening to, thus allowing the listeners to understand the role of the songs in the streamer's life. Being able to share music together in real-time will enhance the ability of music to function as a reflection of the user's feelings, emotions, and thoughts.

The system according to the present disclosure also provides for a unique method of creating a personally DJ'ed music streaming using associations described above. Users can create a list of songs that is played by the system. The list can contain individual songs, association lists, or conditionals. When an association list is played, all or some songs that are linked to one or more associations would play. A conditional could be added to prevent continuation of the music until such time as the conditionals are met. For example, if the user wanted to hear a song with another user, they could place a conditional not to proceed unless that user is logged on and listening to the stream. Once the condition was met, the song would start to play.

The system according to the present disclosure also provides for a unique method of creating a radio station that can be controlled using a "Checks and Sliders" system. Broad categories could be added to those available to be checked or "X"ed. Any category that has a check is permitted to be played, and any category with an "X" is not permitted to be played. Sliders are included to make fine adjustments. For example, having a check next to "Rock" and "Indie" would ensure that only rock or indie songs would be given preference. If an "X" were on Rap, then no rap songs would be played. If a slider were available between "strict adherence" and "loose adherence" then the user could choose how strict or loose the music would adhere to the variables chosen. In essence changing the variety of music played (strict adherence=less variation, loose adherence=greater variation). Similarly, a slider between "common" and "uncommon" might be used to choose if songs chosen were commonly heard or not commonly heard. This could be used to adjust how "popular" the songs chosen by the system are.

In one aspect, the present disclosure provides a method for cognitive association including tracking an output of media over time for a particular user and create a list of the output media for the particular user, generating a link between the media and at least one of a person, a place, an event, an era, an emotion, a theme, a photo, a video, or a social media post, creating a comprehensive experience of a specific event including at least one of music played at the specific event, photos displayed at the specific event, videos played at the specific event, social media posts about the event, people present at the specific event, or any combinations thereof, receiving an input of a particular media, and outputting the particular media received and at least one of the link generated or the comprehensive experience created.

In another aspect, the present disclosure provides a system for cognitive association including a tracking unit configured to track an output of media over time for a particular user and create a list of the output media for the particular user, a link generation unit configured to generate a link between the media and at least one of a person, a place, an event, an era, an emotion, a theme, a photo, a video, or a social media post, an events recording unit configured to create a comprehensive experience of a specific event including at least one of music played at the specific event, photos displayed at the specific event, videos played at the specific event, social media posts about the event, people present at the specific event, or any combinations thereof, a media input unit configured to receive an input of a particular media, and a media output unit configured to output the particular media received by the media input unit and at least one of the link generated by the link generation unit or the comprehensive experience created by the events recording unit.

In another aspect of the present disclosure provides for a non-transitory computer readable storage medium storing instructions, which when executed, cause a system or processor to carry out some or all of the steps provided in any of the methods described herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

At its most basic level, the systems and methods according to the present disclosure create digital associations between an artistic piece, or pieces, and a person, sentiment or event. While this could be for any form of art or digital media, for simplicity the present disclosure describes the systems and methods of the present disclosure with respect to music. However, it should be noted that the systems and methods described herein could apply to any form of artistic medium or digital media.

Figure 1:
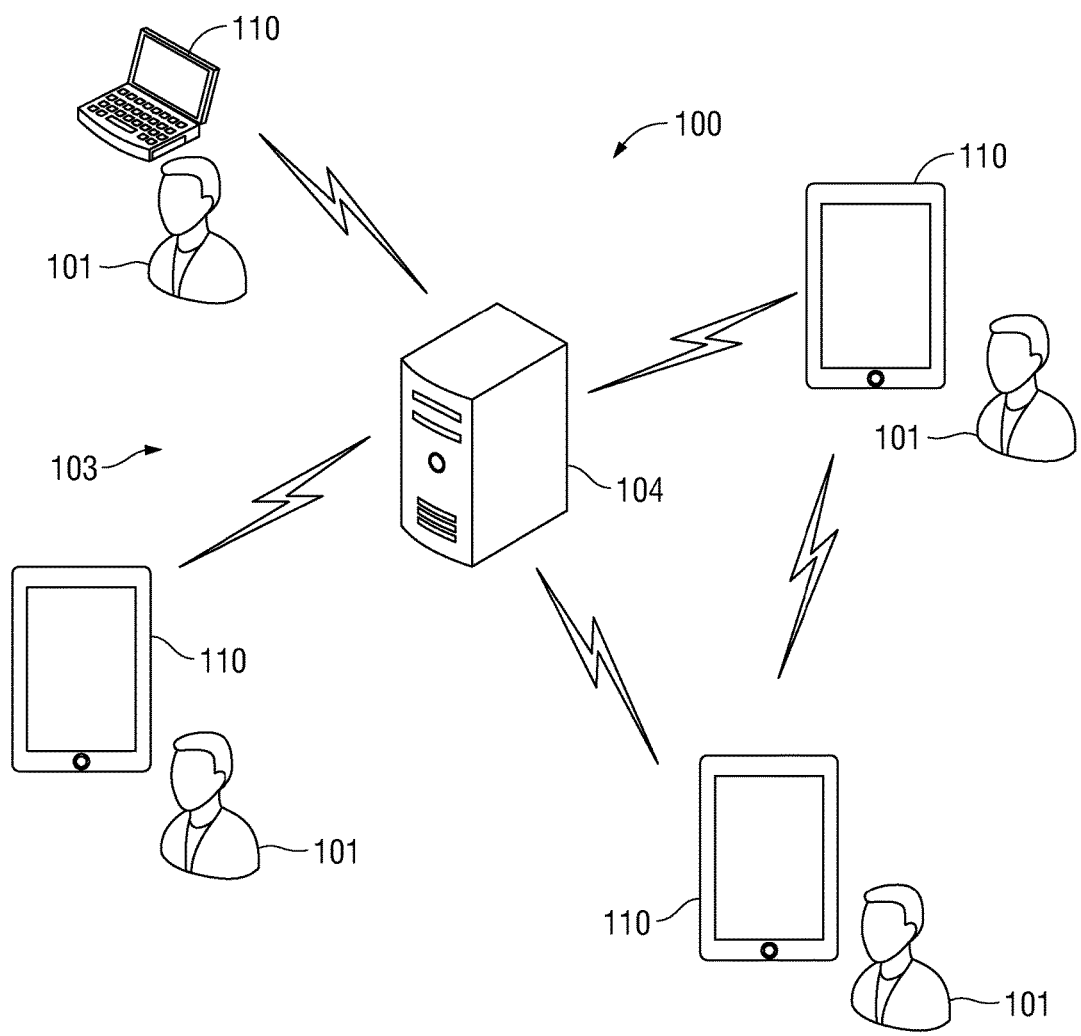
FIG. 1 illustrates an example system according to the present disclosure.

FIG. 1 illustrates an example cognitive artistic system 100 according to certain embodiments of the present disclosure.

Cognitive artistic system 100 includes remote devices 110 operated by users 101 that communicate through data collection server 104 to other remote devices 110 operated by other users 101. Additionally, or alternatively, remote devices 110 may communicate directly with each other without the need of the data collection server 104. Users 101 may be associated with each other within a group 103. Each user 101 may control a remote device 110 for inputting/receiving communicative data through data collection server 104 to and from different remote devices 110. Although this particular implementation of cognitive artistic system 100 is illustrated and primarily described, the present disclosure contemplates any suitable network implementation of cognitive artistic system 100, or any of its components, according to particular needs of an institution or facility. For example, although described as including processing through data collection server 104, it is to be appreciated that remote devices 110 include all structural components capable of performing any of the processing and/or methods described herein that are carried out by data collection server 104.

Continuing with reference to FIG. 1, users 101 may be individuals that wish to view artistic media on remote devices 110, such as and without limitation photos, videos, and/or music. Users 101 may be associated with a particular group 103. Group association of the users 101 may depend on the physical location of the users 101, where the users 101 register, where the users 101 will be at a future date, or any other such association as would be understood in the art. In one embodiment, users 101 are associated with a particular group 103 based on a particular event that the users 101 are attending. However, it is envisioned that users 101 may be associated with a particular group 103 by other means as well.

Continuing with reference to FIG. 1, users 101 may use remote devices 110 to play artistic media including, without limitation photos, videos, music, and/or any other such media, either locally within remote device 110, and/or through data collection server 104 via remote device 110. Remote device 110 may be any device that is capable of receiving input data from users 101 and transmitting the data to data collection server 104, for receiving data from data collection server 104, for transmitting data to other remote devices 110, for receiving data from other remote devices 110, and for displaying graphical user interfaces as described below. For example and without limitation, remote device 110 may be a desktop computer, laptop computer, tablet device, mobile device such as a cellular phone, smart phone, or any other device suitable for, and capable of receiving input/commands from users 101 and communicating the inputs/commands to data collection server 104 and or other remote devices 110 operated by other users 101 through data collection server or directly to/from other remote devices 110.

Figure 2A:
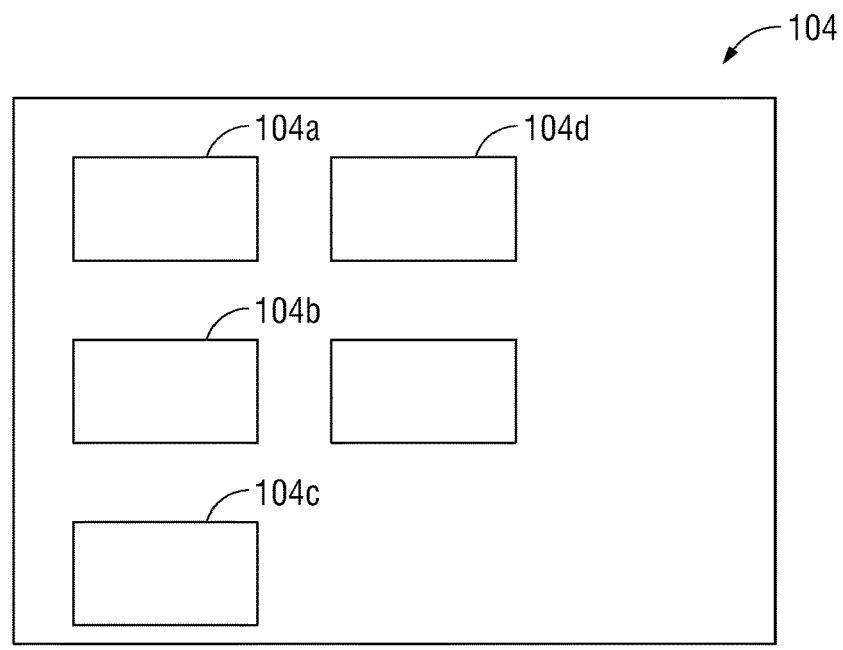
FIG. 2A is a schematic illustration of an example data collection server of the artistic media system of FIG. 1, according to certain embodiments of the present disclosure.

Turning now to FIG. 2A, and continuing with reference to FIG. 1, data collection server 104 of cognitive artistic system 100, will now be discussed with particular detail. Although the components of data collection server 104 are described to be within data collection server 104, it is understood that any or all of the components may additionally, or alternatively, be components of remote devices 110. Data collection server 104 (and/or remote devices 110) may include a central processing unit 104a, a storage unit or database 104b, a display unit 104c, a receiving unit 104d, and any other units described herein. It is understood, that although particular units of data collection server 104 described below are described as being configured to perform particular tasks or functions, any of the units of data collection server 104 may be capable of performing any of the tasks of any of the other units of data collection server 104. The term "unit," as used herein, may include modules, software and/or hardware, digital or analog, that cooperate to perform one or more control tasks and may include digital commands, power circuitry, networking hardware, an/or a set of programmable instructions for implementation and execution by at least one processor, or central processing unit 104a, to carry out any of the steps described herein.

Continuing with reference to FIG. 2A, the processor 104a of data collection server 104 is configured to process any of the steps or functions of data collection server 104 and/or any of the modules or units therein. The term processor, as used herein, may be any type of controller or processor, and may be embodied as one or more controllers or processors adapted to perform the functionality discussed herein. Additionally, as the term processor is used herein, a processor may include use of a single integrated circuit (IC), or may include use of a plurality of integrated circuits or other components connected, arranged or grouped together, such as controllers, microprocessors, digital signal processors, parallel processors, multiple core processors, custom ICs, application specific integrated circuits, field programmable gate arrays, adaptive computing ICs, associated memory, such as and without limitation, RAM, DRAM and ROM, and other ICs and components.

Continuing with reference to FIG. 2A, the database 104b of data collection server 104 may be configured to store information pertinent to users 101, groups 103, history of transactions, and any other such data as may be deemed necessary for implementation of the methods described herein. Additionally, or alternatively, database 104b of data collection server 104 may store funds in a prepaid account associated with each user 101 or a group 103 of users 101. Additionally, or alternatively, database 104b of data collection server 104 may be tied to a third-party payment system.

As used herein, the term database or storage unit may be understood to include, and is not limited to, repository, databank, database, cache, storage unit, cloud, and the like, a data repository, any computer or other machine-readable data storage medium, memory device or other storage or communication device for storage or communication of information, currently known or which becomes available in the future, including, but not limited to, a memory integrated circuit, or memory portion of an integrated circuit (such as the resident memory within a processor), whether volatile or non-volatile, whether removable or non-removable, including without limitation RAM, FLASH, DRAM, SDRAM, SRAM, MRAM, FeRAM, ROM, EPROM or E2PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment.

Additionally, or alternatively, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory may be adapted to store various look up tables, parameters, coefficients, other information and data, programs or instructions (of the software of the present disclosure), and other types of tables such as database tables.

Continuing with reference to FIG. 2A, the display unit 104c of data collection server 104 may be configured to display different graphical user interfaces, as described in further detail below. The receiving unit 104d of data collection server 104 may be configured to receive commands and/or input from users 101, as will be described in further detail below. In particular, the receiving unit 104d may receive information or data (such as cognitive associative data), such as and without limitation, data associated with the type of music being played, the type of photo being displayed, the type of video being displayed, the type of event being displayed, or any other such data that may be deemed proper.

Figure 2B:
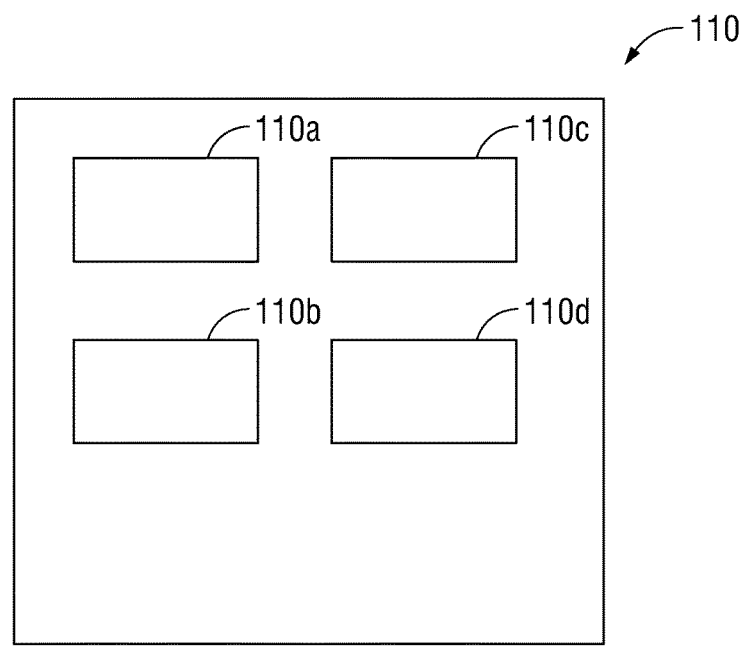
FIG. 2B is a schematic illustration of an example remote device of the artistic media system of FIG. 1, according to certain embodiments of the present disclosure.

FIG. 2B illustrates an example remote device 110. Remote device 110 includes a central processing unit 110a, a storage unit or database 110b, a display unit 110c, and a receiving unit 110d. The components of remote device 110 are similar to the components of data collection server 104, and therefore will not be described in detail for brevity. Receiving unit 110d may additionally include a microphone.

Figure 3A:
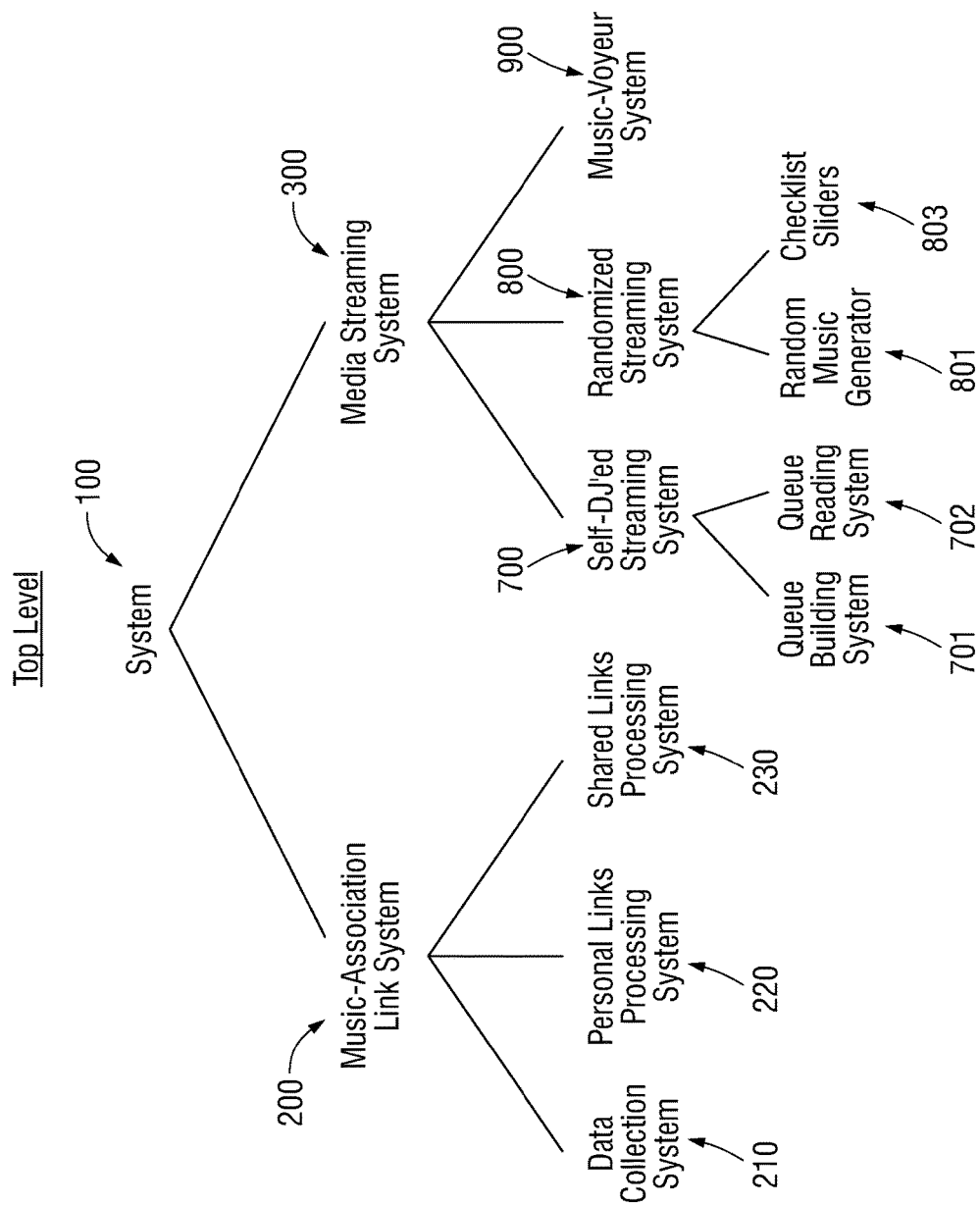
FIG. 3A is a schematic illustration of an example music association system according to the present disclosure.

Turning now to FIG. 3A, cognitive artistic system will be illustrated and describe generally at its broadest level as system 100. System 100 includes one or both of a 1) Music-Association Link System 200 and/or a 2) Media Streaming System 300, as described below. The Music-Association System 200 broadly consists of one or more of the following: 1) Data Collection System 210, 2) Personal Link Processing System 220, and/or a 3) Shared Link Processing System 230, as described below. The Media Streaming System 300 may include some or all of: 1) self-DJ'ed streaming system 600; randomized streaming system 700; and/or 3) music-voyeur system 300.

Figure 3B:
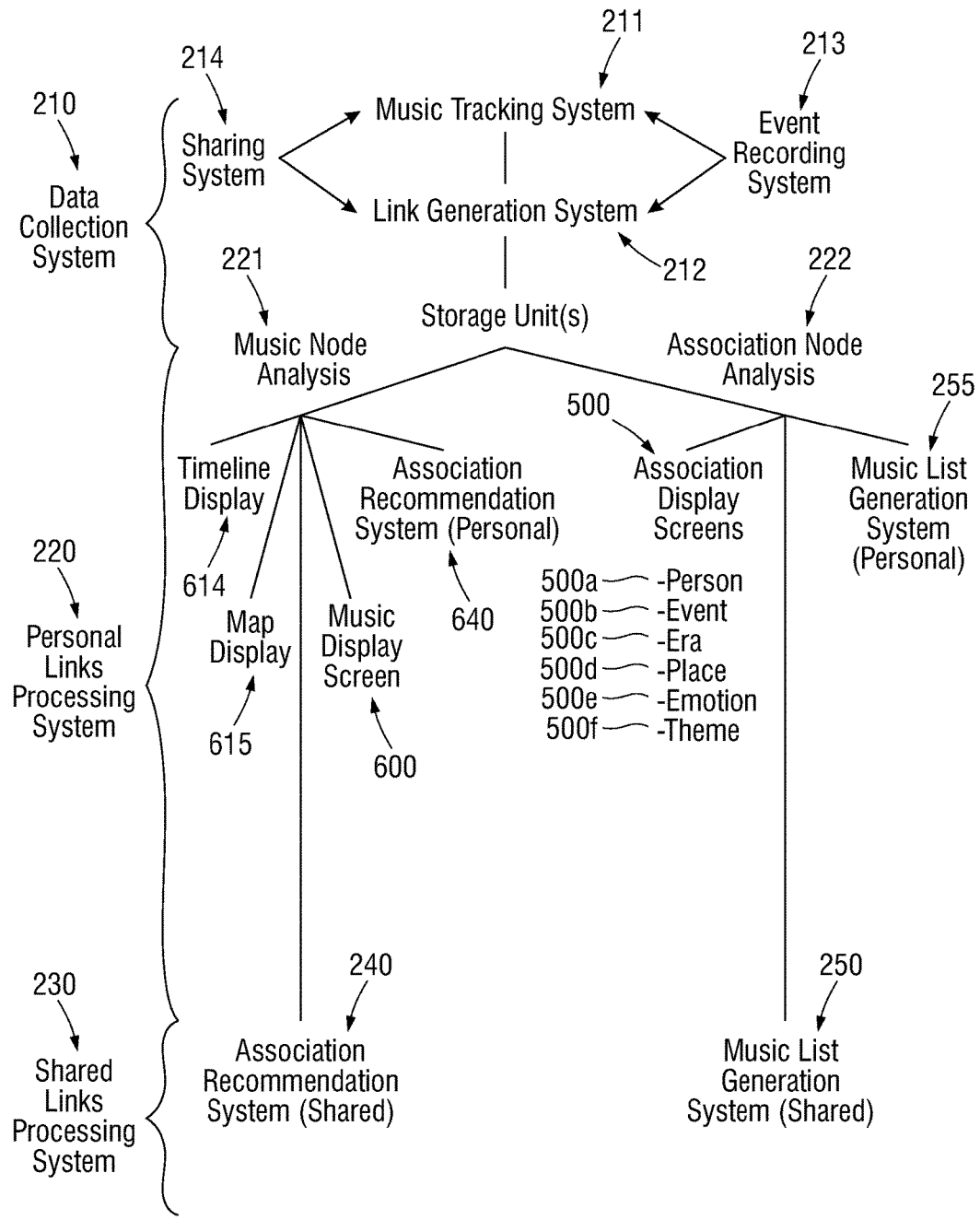
FIG. 3B is a schematic illustration of an example media streaming system according to the present disclosure.

Continuing with reference to FIG. 3A, and with reference to FIG. 3B, the Data Collection System 210 may consists of a one or more of the following: 1) Music Tracking System 211, 2) Link Generation System 212, 3) Event Recording System 213, and/or a 4) Sharing System 214. Information gathered from the "Data Collection System" 210 may be stored in the data collection server 104 and/or any other storage unites described herein. In one aspect, information is stored as either a "node" or a "link". Nodes can be specific to a single user or can be shared between two or more users.

The "Music Tracking System" 211 consists of a system and method for tacking the music that one listens to over time and/or music selected based on the user's personal interest. The "music Tracking System" 211 attempts to create a complete list of every song that an individual hears during their life or that the user finds important. The list may or may not be organized by date and time played when available creating a chronologic list of music which will be heretofore referred to a "Music Chronology". This may include a multitude of input methods including but not limited to 1) identification of ambient music, 2) importing from third parties, 3) importing from the "Media Streaming System" 300 (FIG. 3), described below, 4) from the "Event Recording System" 213 (described below), 5) from the "Sharing System" 214 (described below), and/or 6) manual input. Third parties mentioned above include, but are not limited to, bars, restaurants, radio stations, music streaming services, and other applications which might be incorporated into hardware included stereo system (including but not limited to car stereos, home stereos, etc.). Metadata and other data available at the time of input will also be recorded including, but not limited to location, date, time, etc. Other methods not described herein that contribute to the above stated goal can similarly be conceived of and are included in this patent.

The "Link Generation System" 212 consists of a system and method for linking two or more nodes. Nodes may be specified as memory locations specified for a specific piece of music and/or an association with that music including but not limited to people, places, events, eras, emotions, and/or themes. Nodes may also include photos, videos, or social media posts. Other nodes that contribute to the personal connection between a user and artistic media not described herein can be conceived of and are included in this patent. Links can be manually inputted or can be spontaneously generated based on metadata, the "Event Recording System" 213 described below, the "Sharing System" 214 described below, and/or any combinations thereof. Other methods not described herein for generating links between nodes can be conceived of and are included in this patent.

The "Events Recording System" 213 consists of a system and method for spontaneously generating nodes and links associated with a specific event. The "Events Recording System" 213 creates a comprehensive experience of specific event(s) that includes, but is not limited to, music played at the event, people present at the event, photos and/or videos of the event, social media post about the event, and/or any combinations thereof. The user interface may include an "Event Timer" button. Once activated by the user, an event node is created. The node is given a generic name which can latter be modified by the user. The "Events Recording System" 213 may or may not interact with the "Music Tracking System" 211 such that when while activated, the system routinely samples ambient music for songs detectible by the device's microphone and adds the songs to the user's "Music Chronology". Additionally, the "Events Recording System" 213 may or may not interact with the "Link Generation System" 212 such that links are automatically created between the nodes for each specific song and the event in progress. Other methods of music input as described above can also be conceived of which will similarly create spontaneous links as herein described. Also, while the "Events Recording System" 213 is activated, any photo, video, and/or social media post generated by the device may similarly be linked to the event in progress. Other nodes relevant to the event in progress can be conceived of and are included in this patent. Upon completing an event by tapping the "event timer" a second time, associations are no longer spontaneously linked to the event in question. Users linked to the event can add songs and other associations manually at a later date if desired. Other methods for creating events can be conceived of (including but not limited to manual entry and/or through syncing to the user's calendar) and also included within the scope of this patent. Event Nodes can be unique to an individual or can be shared between two or more users.

The "Sharing System" 214 consists of a system and method for sharing nodes between individuals. Nodes representing pieces of music or other art are shared between all users of the system. Similarly, common emotions and themes may be shared between large groups of individuals. Other nodes such as events and people might be shared by smaller groups of people of two or more. The "Sharing System" 214 includes a system and method of inviting others to link to specific node or nodes as well as a system for accepting an invitation to link to a node or nodes. The "Sharing System" 214 may or may not interact with the "Link Generation System" 212 such that when an invitation is accepted, links are created spontaneously to the node in question as well as other relevant node or nodes. Additionally, the "Sharing System" 214 may or may not interact with the "Music Tracking System" 211 such that upon accepting an invitation, the music list associated with the node being shared can electively or automatically be added to the acceptor's "Music Chronology."

All data collected by the above mentioned "Music Tracking System" 211, the "Link Generation System" 212, the "Event Recording System" 213, and the "Sharing System" 214 may be stored in one or more storage unit or units or remote devices 110 and/or data collection server 104. Other data including, but not limited to, photos, videos, user information, billing information and may or may not also be stored. Although the system and method described above uses "nodes" and "links", other data formats that achieve similar results can also be conceived of and are included in this patent. Storage Unit or Storage Units 104 may be a storage device local to the systems/devices described herein and/or may be remotely located therefrom.

The "Personal Link Processing System" 220 contains one or more of the following: 1) Music Node Analysis System 221, and/or a 2) Association Node Analysis System 222. Other data analysis systems that utilize the data stored in the Storage Unit or Storage Units 104 can also be conceived of and are included in this patent.

The "Music Node Analysis System" 221 starts with the selection of a single piece of music. Links connected to the music node can be analyzed to achieve a variety of effects. Two broad categories of analysis involve focusing on links specifically created by the user's personal "Link Generation System" 212 and links generated by all users to the node in question. The former is a component of the "Personal Link Processing System" 220 and the latter a component of the "Shared Link Processing System" 230.

Figure 6:
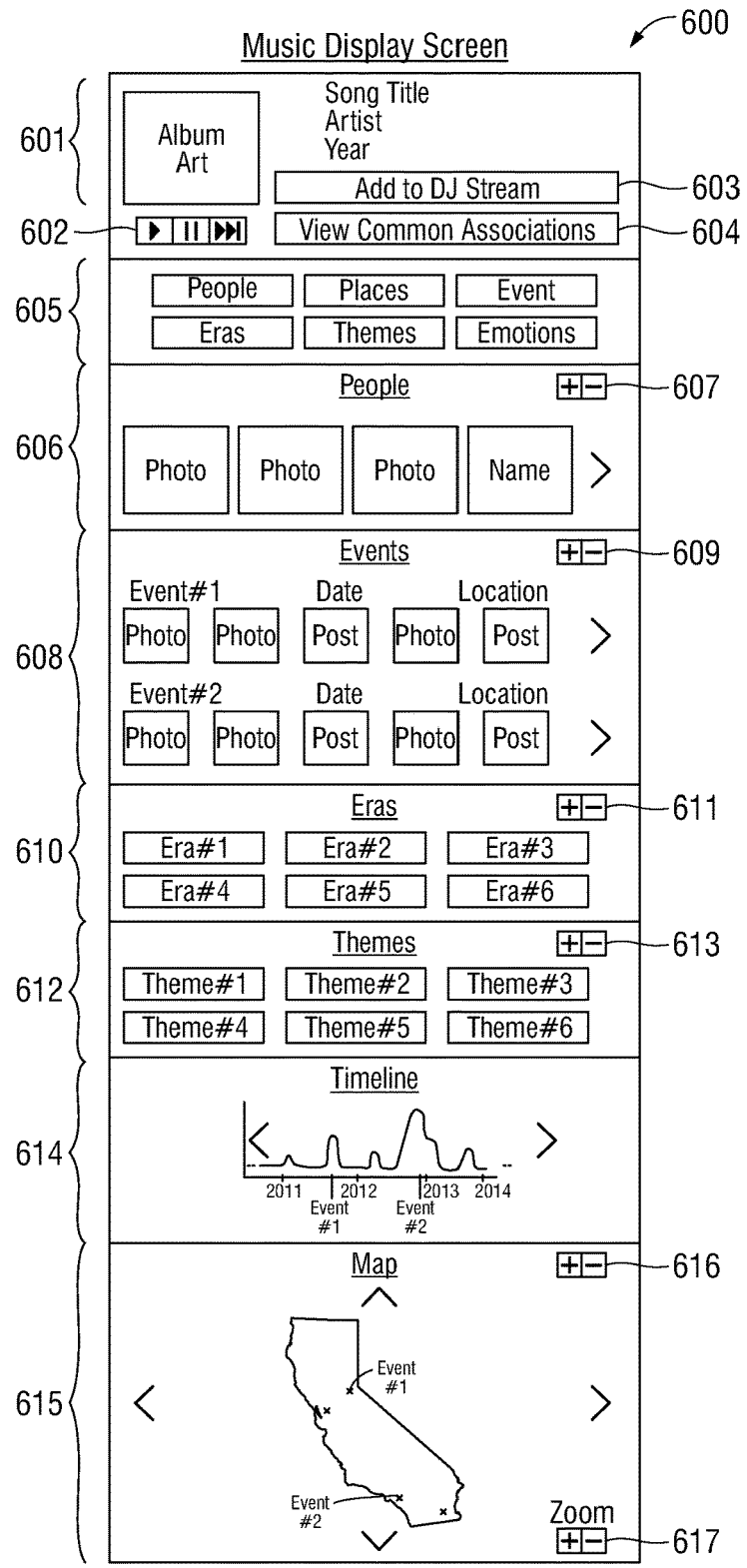
FIG. 6 is an example graphical user interface according to the present disclosure.

With brief reference to FIG. 6, and continuing with reference to FIG. 3B, the "Music Node Analysis System" 221 component of the "Personal Link Processing System" 220 provides graphic displays 600 including, but not limited to "Music Display Screens" 600, "Timelines" 614, and "Map Display Screens" 615. Additional data processing may or may not be performed by an "Association Recommendation System" 240/640. Other kinds of data analysis of the music nodes can be conceived of and are included in this patent.

The "Association Recommendation System (Personal)" 240 consists of a system and method for analyzing the instances the song in question was heard, and predicting possible associations that might have occurred. This may then be presented to the user recommending a potential association the user did not create. This may include matching instances when the song was heard to the user's calendar. Similarly, or alternatively, it may match the song to photos or take at the same time. Similarly, or alternatively, it may match the song to a social media post. Similarly, or alternatively, it may identify periods when the song was listened to with high frequency and identify a unique location during that time suggesting a link between the song and the location. Other algorithms can be conceived of for recommending personal links to associations and are included in the patent.

The "Association Node Analysis System" 222 starts with the selection of a non-music or Association Node. Links connected to the node can be analyzed to achieve a variety of effects. Two broad categories of analysis involve focusing on links specifically created by the user's personal "Link Generation System" 212 and links generated by all users to the node in question. The former is a component of the "Personal Link Processing System" 220 and the latter a component of the "Shared Link Processing System" 230.

The "Association Node Analysis System" 222 component of the "Personal Link Processing System" 220 provides graphic displays 500 including, but not limited to various "Association Display Screen" 500 for people 500*a*, places 500*b*, events 500*c*, eras 500*d*, themes 500*e*, and or emotions 500*f*, each of which will be described in greater detail below with regard to FIGS. 5A-5F. Additional data processing may or may not be performed by a "Music List Generation System (Personal)" 235. Other kinds of data analysis of the music nodes can be conceived of and are included in this patent.

The "Music List Generation System (Personal)" 235 consists of a system and method for generating lists based on specific associations provided by the user. One or more associations can be included. For example, the user could input "work-out" and all songs that the user has linked to the "work-out" theme may be added the list. The user could also input "happy" thus creating a list of songs that are linked to both "work-out" AND "happy", in essence making a list of happy work-out songs. The list of music can then be exported for play by the "Media Streaming System" 300 described herein, or it similarly may be played by third party applications. Other algorithms can be conceived of for generating lists of songs based on personal links to associations and are included in the patent.

The "Shared Links Processing System" 230 consists of one or both of the following: an "Association Recommendation System (Shared)" 240, and/or a "Music List Generation System (Shared)" 250. The former is a component of the "Music Node Analysis System" 221 and the latter a component of the "Association Node Analysis System" 222.

The "Association Recommendation System (Shared)" 240 consists of a system and method for generating a list of common associations for a given song based on links common to two or more individuals. In one aspect, the shared link between a music node and an association node is weighted based the number of individuals who have created that link. For example, Song A may be commonly linked to Associations F, G, H, and I. Fifty individuals have created links between Song A and F. One hundred individuals have created links between Song A and G. Ten Individuals have created links between Song A and H. Ten Thousand individuals have created links between Song A and I. Based on various algorithms, Link A-I may be weighted the heaviest followed by A-G, A-F, and A-H. The list of common associations for a song may be ordered based on the link weights. Associations can be selected and duplicated using the "Link Generation System" 212 to create a personal link that can be processed using the "Personal Links Processing System" 220. A multitude of algorithms can be imagined to organize the list for a specific song based on the frequency the links that have been created between the song and various associations.

The "Music List Generation System (Shared)" 250 consists of a system and method for generating a list of music for one or more associations based on shared links common to two or more individuals. As with the "Association Recommendation System (Shared)" 240 described above, the list of songs provided for any one association is organized based on the weights of the link between the association selected and the various songs. Multiple associations can be provided to modify the lists provided. For example, you could search "work-out" alone which may provide a list of the songs most commonly associated with "work-out". By searching "Work-out" AND "Happy" the system may provide a list of the songs most commonly associate with "Work-out" AND "Happy." Various algorithms can be conceived of for organizing such a list based on the weights of the various links in question. The list of music can then be exported for play by the "Media Streaming System" 300 described herein, and/or may similarly be played by third party applications. Other algorithms can be conceived of for generating lists of songs based on shared links to associations and are included in the patent.

Figure 8:
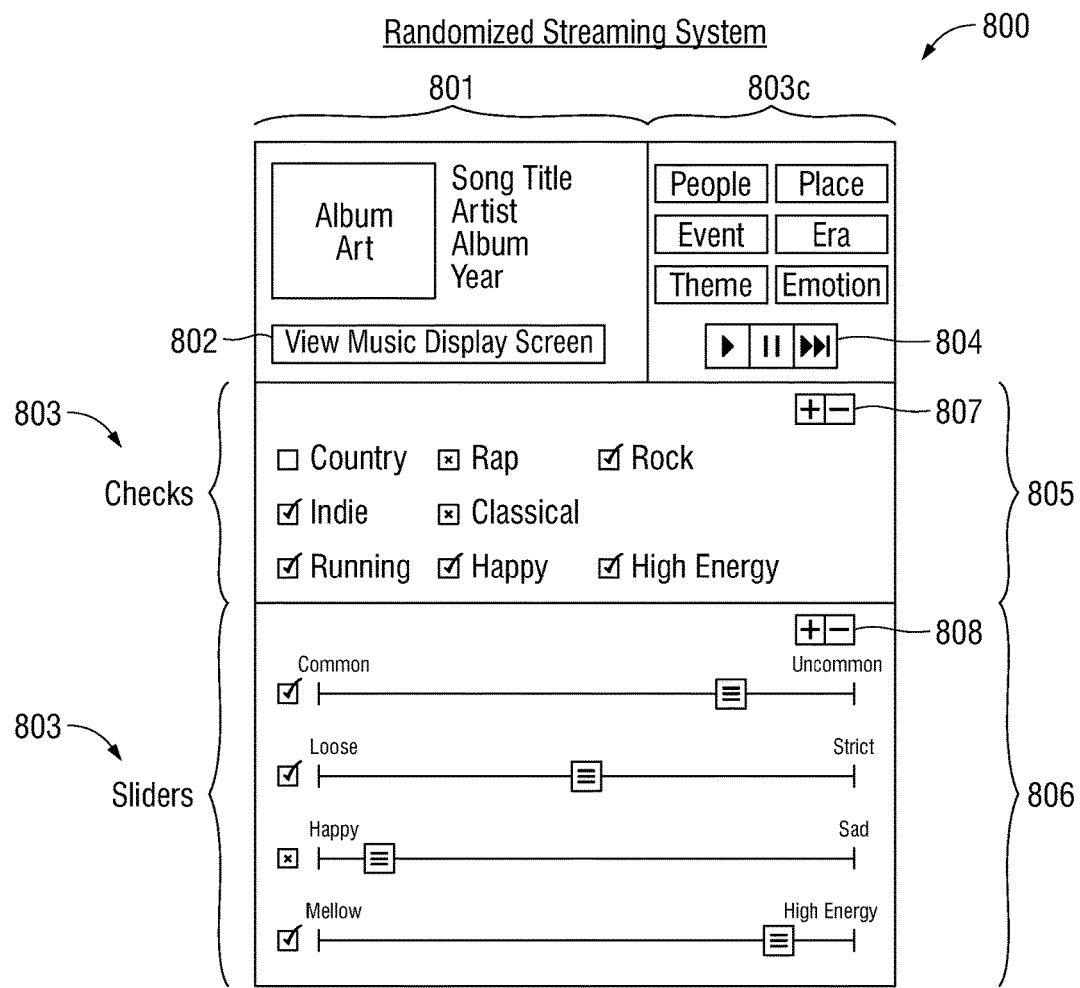
FIG. 8 is an example graphical user interface according to the present disclosure.
Figure 9:
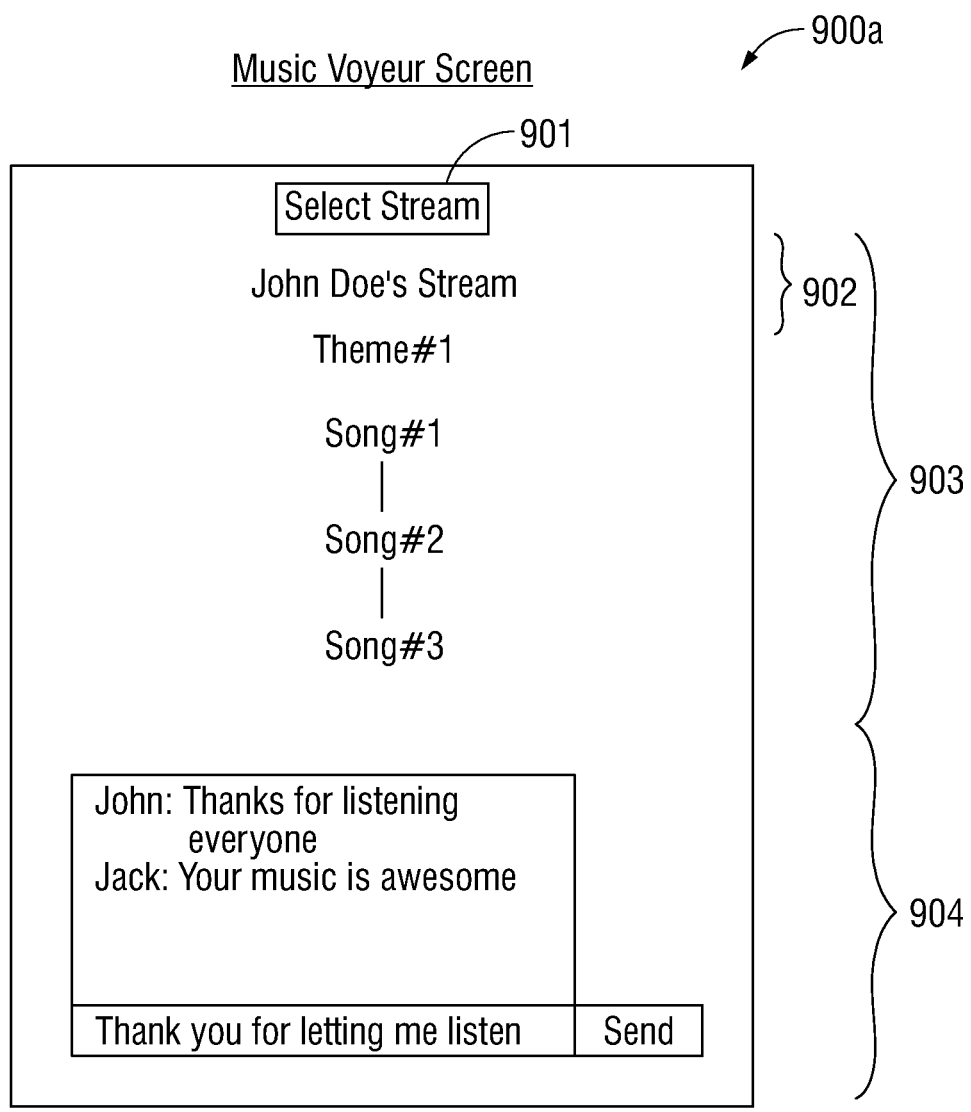
FIG. 9 is an example graphical user interface according to the present disclosure.

Referring back briefly to FIG. 3A, and with continued reference to FIG. 3B, the "Media Streaming System" 300 may broadly consists of one or more of the following: 1) a "Self-Dj'ed Streaming System" 700 (see FIG. 7), 2) a "Randomized Streaming System 800 (see FIG. 8), and/or 3) a "Music-Voyeur System" 900 (see FIG. 9). In addition, there may also include an "Invite System" and/or a "Text/IM System" 305 that is shared between one or more of the streaming systems. Clients on other devices, either within the same network or different network can access the media stream to listen in real-time. The "Invite System" provides a system and method for inviting others to listen to the user's "Self-Dj'ed Stream" 700 or their "Random Music Stream" 800. Users will have the option of selecting what is shared with their listeners. This can include, but is not limited to the songs playing, the list of song/conditions in the Queue (see below), the "Association List" the song is from (see below), the current location, or any combination of the personal associations the user has to the song being played. The "Text/IM System" 305 provides a system and method for all individuals who are listening to the user's stream to communicate through a text message or IM system, and/or any other form of communication including but not limited to video and/or audio communications, and/or any combinations thereof.

The "Self-DJ Streaming System" 700 consists of one or both of a "Queue Building System" 701 and/or a "Queue Reading System" 702.

The "Queue Building System" 701 consists of a system and method for generating, maintaining, and/or modifying readable Queue. Items in the Queue can consist of one or more of the following: 1) a song, 2) an "Association List", or 3) a Conditional, and/or any combinations thereof. Songs are individual pieces of music. "Association Lists" are lists of music generated by the "Music List Generation System (Personal)" 235 and/or the "Music List Generation System (Shared) 250. Conditionals consist of an individual item or set of items that must be met to continue with the "Queue Readying System" 702** described below. Examples of Conditionals include, but are not limited to, the presence or absence of a specific, or group, of individuals, a specific time or location, etc. Other conditionals can be conceived of and are included in the patent. Items within the Queue can be added, deleted, or rearranged.

Continuing with reference to FIG. 3A, and briefly referring to FIG. 8, the "Random Streaming System" 800 consists of a system and method for randomly playing music using a "Random Music Generator" 801 and a "Checks and Sliders System" 803 to make adjustments to the selection of songs played by the "Random Music Generator" 801. The system may contain a basic set of song controls including, but not limited to play, pause, stop, and/or fast-forward. The "Random Music Generator" 801 consists of a system and method for selecting and playing songs based on various algorithms. Algorithms include, but are not limited to ones which utilize variables that are adjustable based on the "Checks and Sliders System" 803. The "Checks and Sliders System" 803 consists of various check boxes and slider. Check boxes may or may not be present for broad categories of music. These can be genres or any other conceivable associations as described in the "Music-Association Link System" 200 (FIG. 3B) including, but not limited to, people, places, events, eras, themes, and/or feelings/emotions, and/or any combinations thereof. Check boxes can be added, deleted, or rearranged. Music played may favor check boxes that are checked, neutral toward check boxes that are empty, and negative towards check boxes that are "X"ed. Various methods can be conceived of for checking/Xing the boxes including, but not limited to, toggling through with successive taps. Sliders may or may not also be present for finer adjustments to the selection of music played. Sliders can be added, deleted or rearranged. Check boxes next to the slider may activate or deactivate a specific slider. Sliders may consist of contrasting concepts on opposite ends of the spectrum. A slider button could be placed anywhere along the slider's line between one extreme and another. For example, activating the "Common/Uncommon" slider and placing the slider towards the "Common" side may signal to the "Random Music Generator" 801 to play songs that are commonly listened to. Conversely, moving the slider towards the "uncommon" side may cause the "Random Music Generator" 701 to play songs that are less common and not frequently listened to. Alternatively, checking the Loose/Strict Slider and placing the slider button near "loose" may play a greater variety of music that is not strictly adherent the variables selected. Conversely, placing the slider button near "Strict" may cause the Random Music Generator to only play songs that fit the criterion specified by the checks and sliders. Other sliders can be conceived of, including but not limited to "happy/sad", "Mellow/Energetic", etc.

Continuing with reference to FIG. 3A, and briefly referring to FIG. 9, The "Music-Voyeur System" 900 consists of a system and method for allowing the user to listen to the music being played on another user's music stream. This includes a means of accepting an invite from other users, requesting an invite to other users, selecting a specific user's stream from those available (i.e. those who have invited the user or who have accepted a request), a means of displaying the music streaming and any other information provided by the streamer, and a means of listening to the streaming music. The Streamer may be able to see who is listening at any particular time. The "Text/IM System" may allow all users listening to a particular stream to communicate with one another.

Turning now to FIGS. 4-9, example graphical user interfaces of remote devices 110 will be described. The user interfaces described herein may be a web page corresponding to a website maintained by one or more computing devices, such as data collection server 104, or may be maintained locally within remote devices 110. The user interface screens described herein, may be accessible by users 101 or groups 103 via a web browser, such as and without limitation Internet Explorer®, Firefox®, Chrome®, etc., via remote devices 110 and/or by an application stored/running locally on remote device 110.

Figures 4A, 4B:
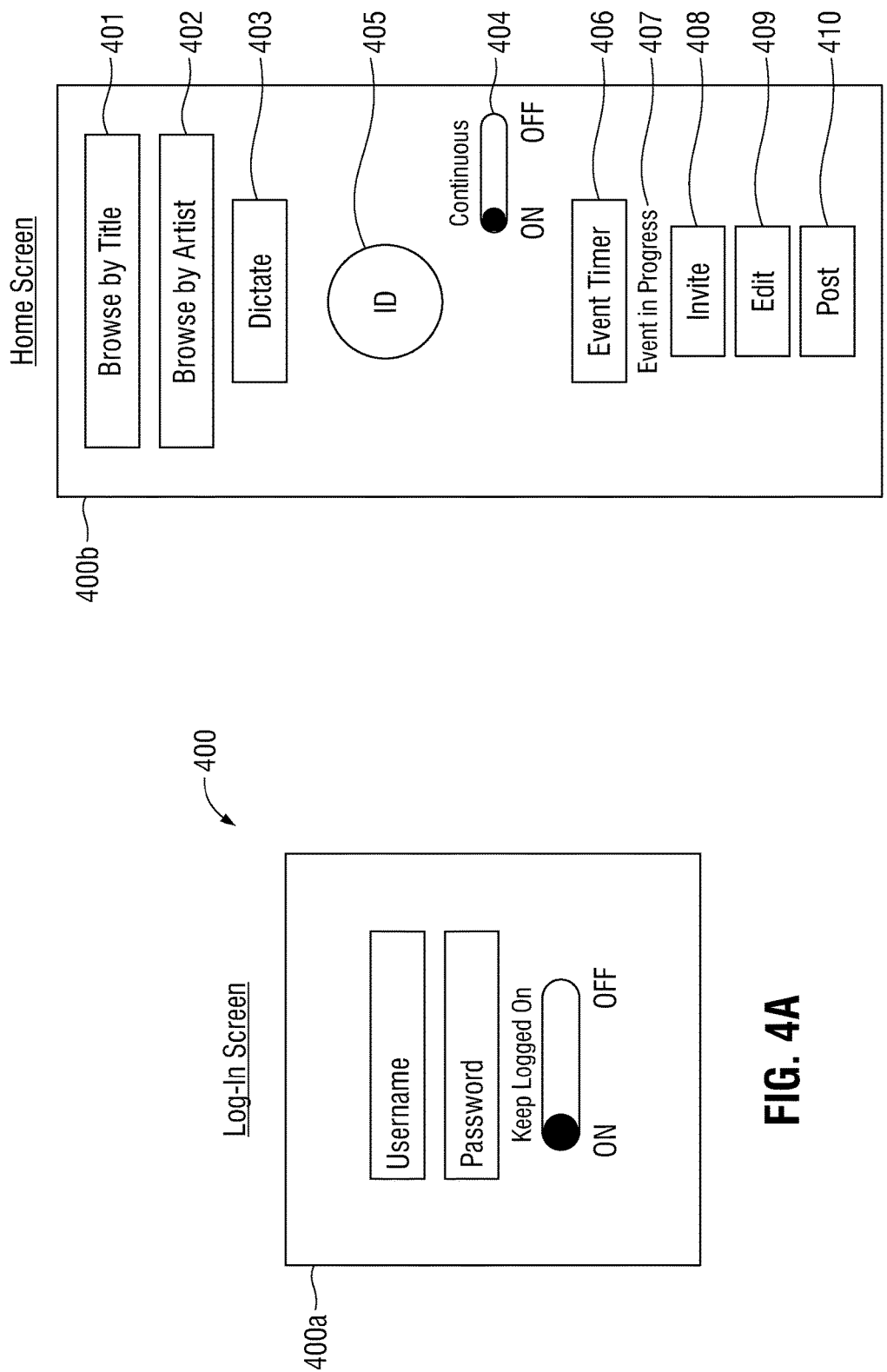
FIG. 4A is an example graphical user interface according to the present disclosure.
FIG. 4B is an example graphical user interface according to the present disclosure.
Figure 5A:
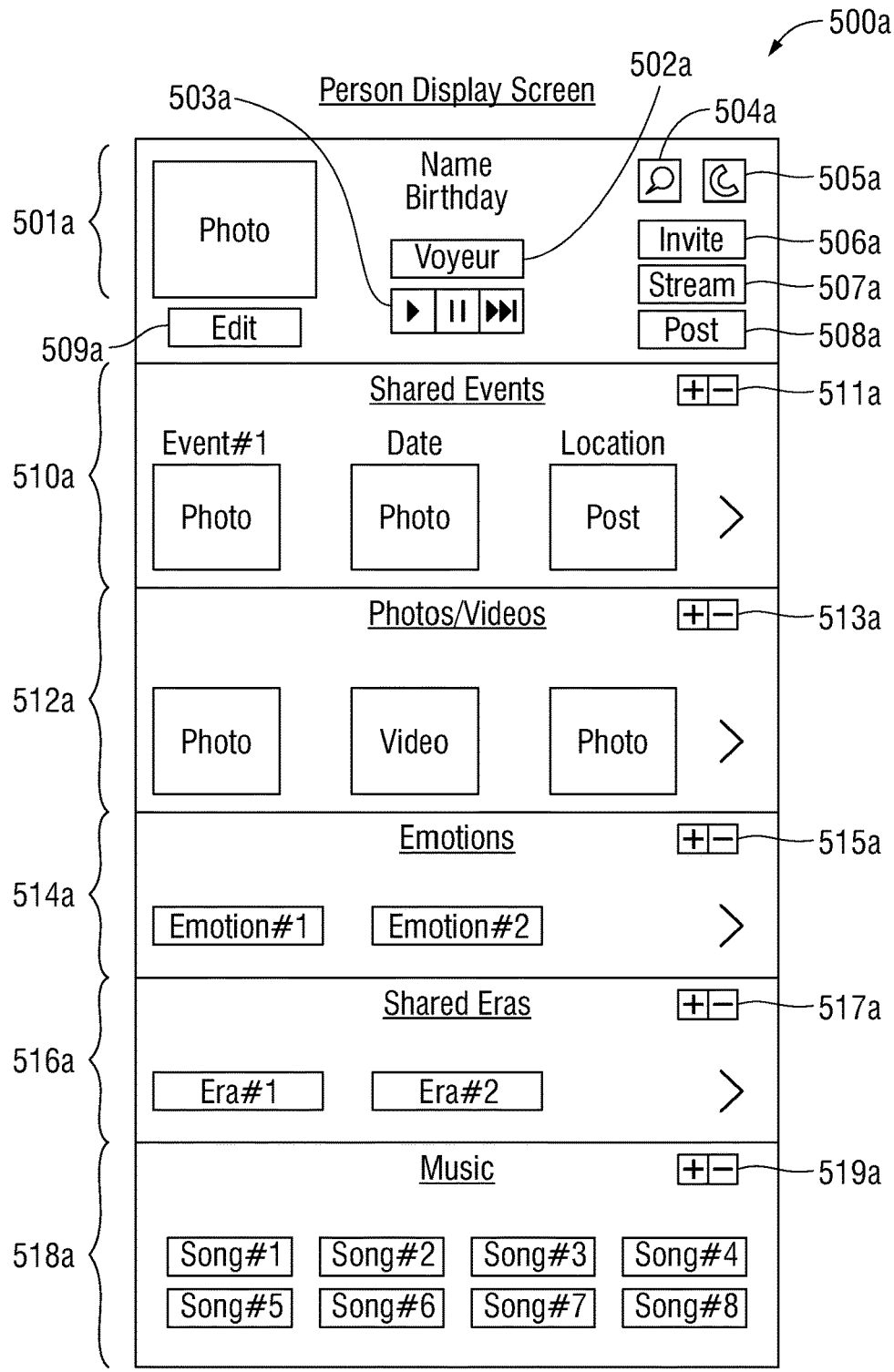
FIG. 5A is an example graphical user interface according to the present disclosure.
Figure 5B:
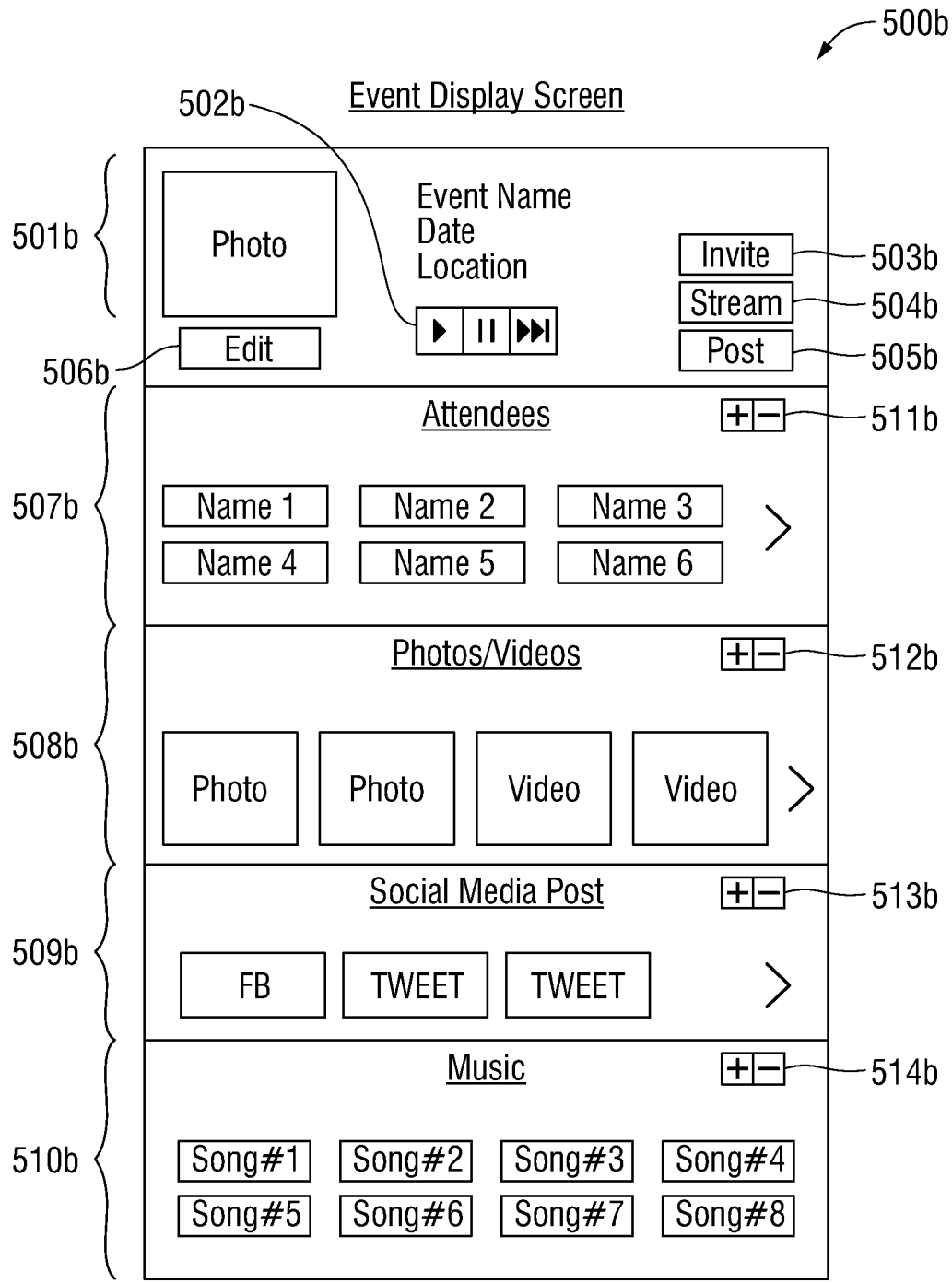
FIG. 5B is an example graphical user interface according to the present disclosure.
Figure 5C:
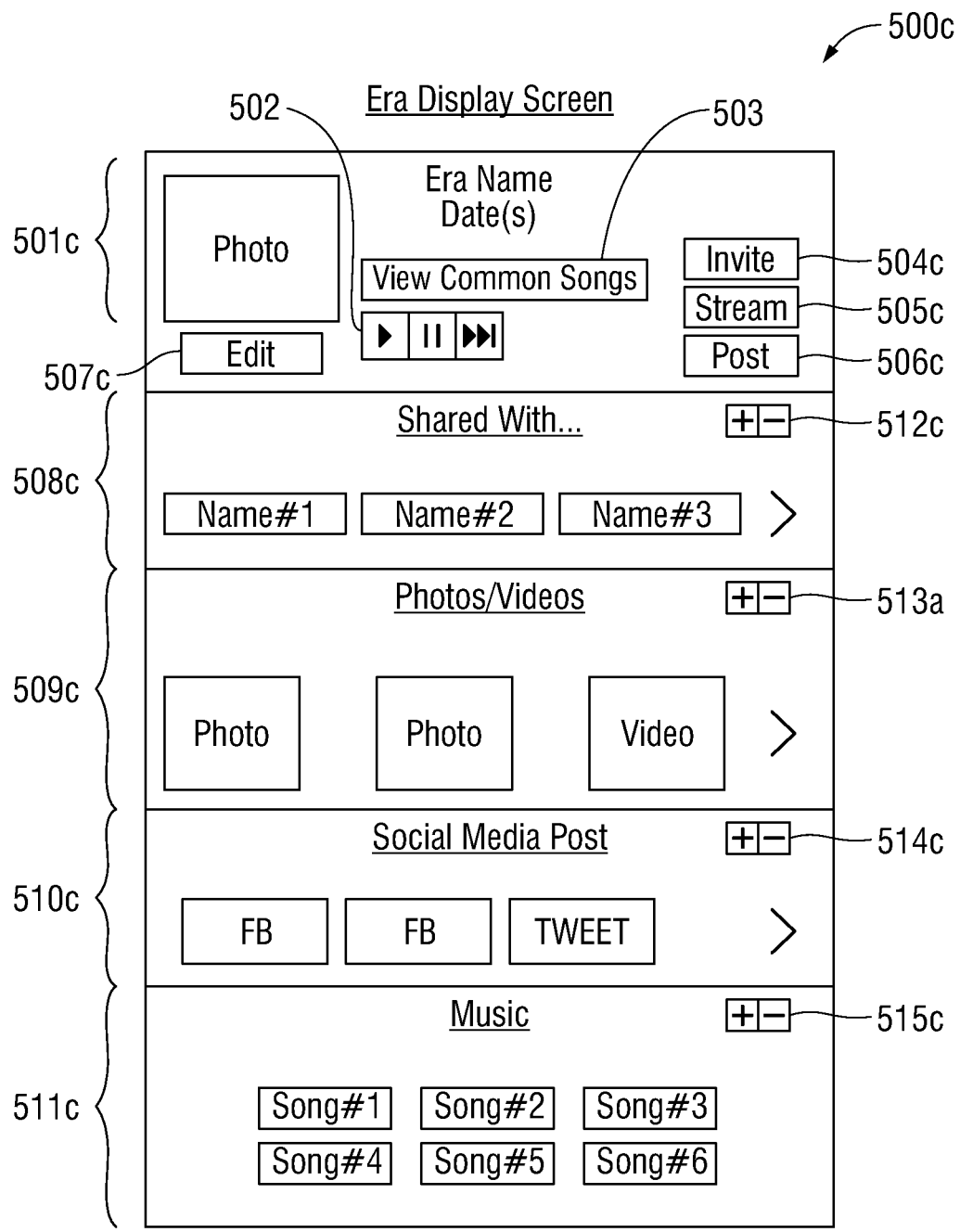
FIG. 5C is an example graphical user interface according to the present disclosure.
Figure 5D:
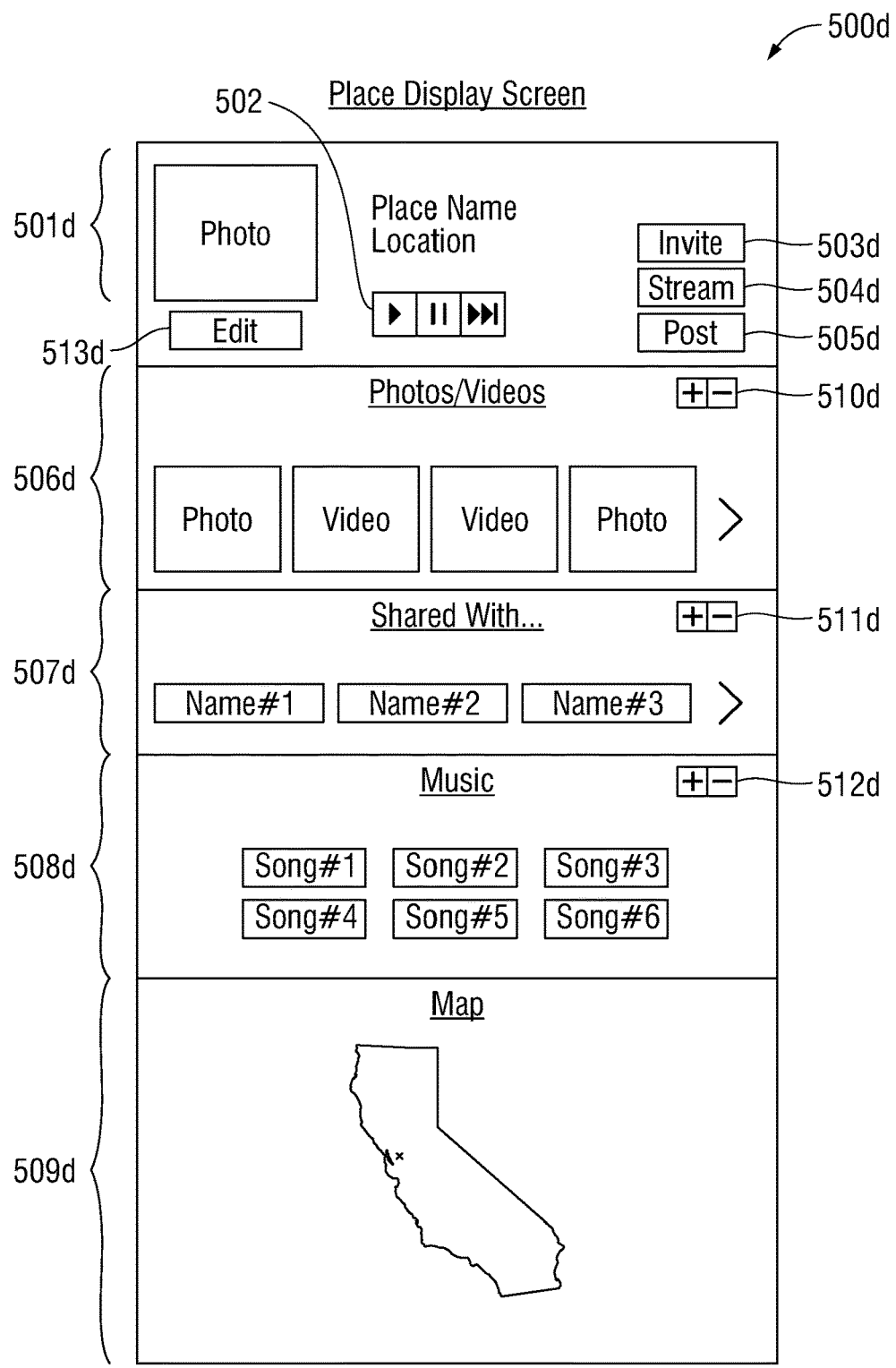
FIG. 5D is an example graphical user interface according to the present disclosure.
Figure 5E:
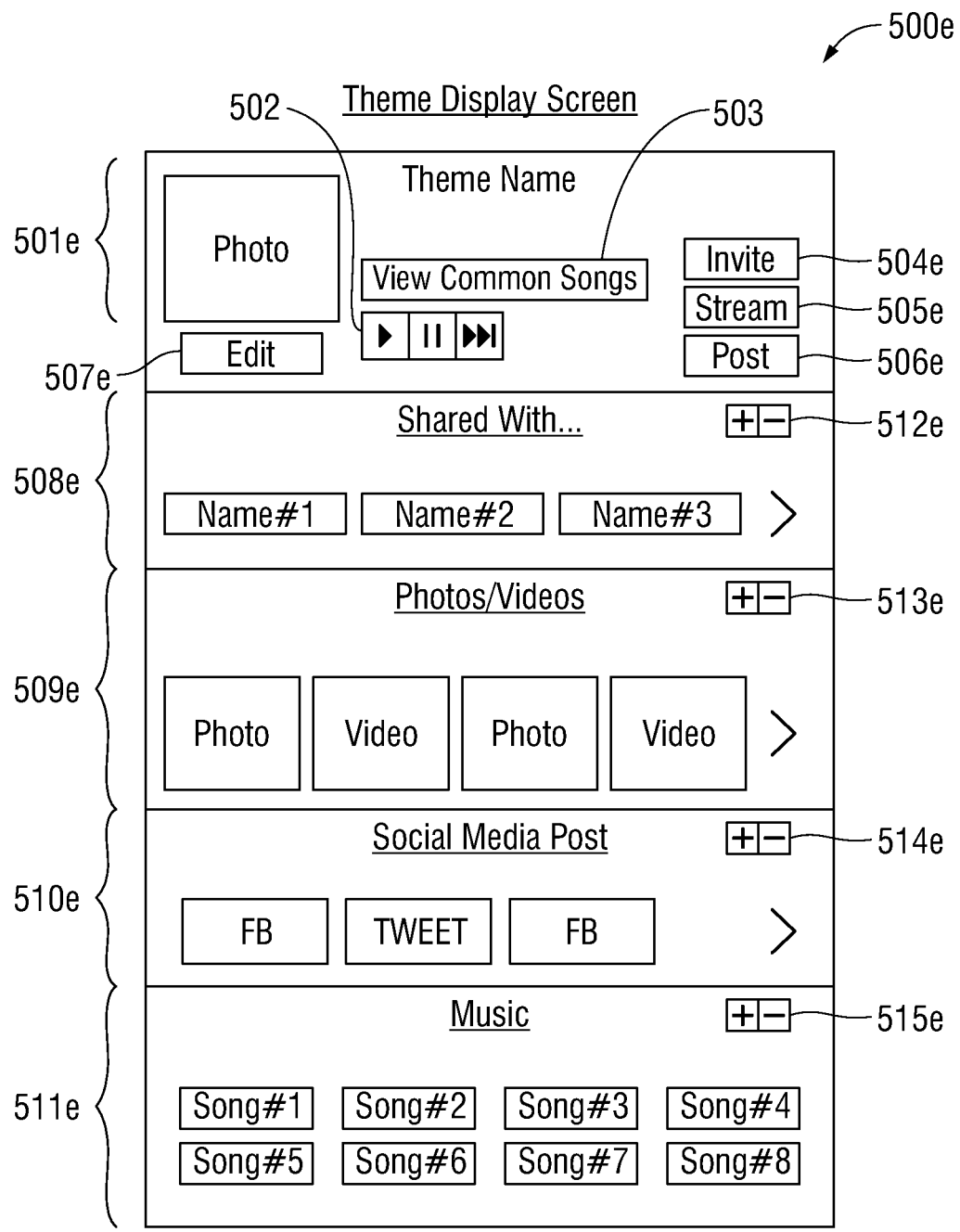
FIG. 5E is an example graphical user interface according to the present disclosure.
Figure 5F:
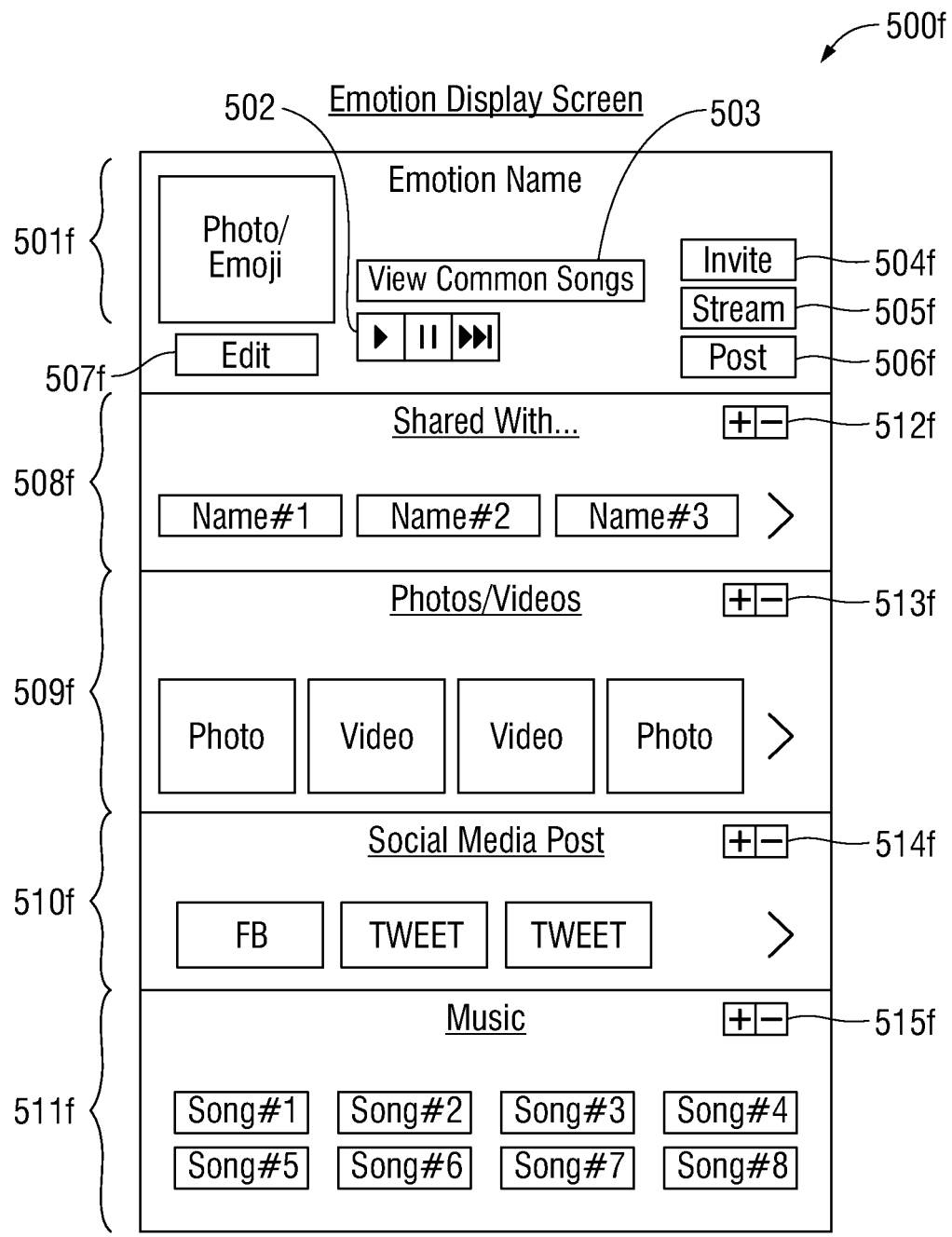
FIG. 5F is an example graphical user interface according to the present disclosure.

FIG. 4A is an example graphical user interface of a remote device 110 of artistic media system 100 illustrating a log-in screen 400*a*. A user 101 may enter his or her personal log-in information using log-in screen 400*a* to gain access to data collection server 104.

FIG. 4B is an example graphical user interface of a remote device 110 of artistic media system 100 illustrating a home screen 400*b*. The home screen 500 is the initial screen for immediate access to critical functionality for identifying or selecting songs and/or starting the "event timer". Song selection can be achieved through various sources including, but not limited to, direct connections to other applications (internal or external to remote device 110) playing music, manually adding the song, and/or an audio ID function. Songs can be manually searched using song title or artist, though functions 401 and 402, respectively. Song selection can be completed by dictating using button 403. Activating toggle switch 404 causes the system to initiate and continuously operate the audio ID function that enables the identification of ambient music. The audio ID function can also be initiated manually through the ID button 405. The "Event Timer" 406 causes the system to mark the beginning and end of a particular event. The first tap of the event time button 406 will generate a new event, mark the start time, and generate a generic name for the event. The timer and event name will be displayed below the "Event Timer" button 406, as shown in section 407. The generic name can be manually changed at this screen by way of button 409. It can also be modified at any time in other sections of the app. Events will consist of at least a "name", a start and stop time; a list of songs identified during that time period and/or other associations to the event may also be included. Other options may be available for adding additional information about the "event" such as location or other associations. Other users can be invited to an event by way of button 408. The event can be posted to other social media platforms using button 410. Once a song is selected, the user is taken to the Music Display Screen for the selected song.

Referring ahead to FIG. 6, The "Music Display Screen" 600 provides a graphic representation of all personal links connected to the music node selected. In one variation, the top of the screen would provide basic information about the selected song. This may include, but is not limited to, one or more of the following: album/song art, song title, album title, year produced, etc. Album art, title, artist and year are displayed at the top of the Music Display Screen in area 601 for the specific song selected. Music control buttons 602 are available to play, pause, or fast-forward the selected song. The song can similarly be added the Personal DJ Stream using button 603. Button 604 can be used to view common associations for the selected song using the "Association Recommendation System (Shared)" 240 (FIG. 3B). Buttons in area 605 are used to generate a link to a corresponding association. Each has an easy user interface to allow quick and easy selection of the desired association. For example:

People: This would have a "favorites list" as well as links to the contacts and social media "Friends".

Events: Although songs are added automatically to "events" the user may want to add ones that were missed. This can be done through the "Events" screen. Tapping the "events" button will take user to a list of available "events", the selected song will be added those "events" chosen by the user.

Eras: "Eras" are broader time periods without a distinct start and stop time. This may include, for example, "80's" or "High school" or "Summer of '93". These will be generated by the user. Previously selected "eras" can be used or new ones added here.

Places: These can be automatically generated by the system or manually selected. There can be a "favorites" list for ease.

Feelings/Emotions: Prepopulated with basic and most commonly used feelings and emotions. Additional emotions may be added by the user manually.

Themes: These are broad categories for music. Examples include, but are not limited to, "work out songs", "break-up songs", "wake-up songs".

Functionality includes the option of rearranging the order of the above options to the user's preference so they can have quick access to those associations they use frequently.

Areas 606, 608, 610, 612, 614, and 615 are available for displaying the user's associations to people, events, eras, themes, times, and locations respectively to the selected song. Each area can be edited using buttons 607, 609, 611, 613, or 615 to add or delete associations as needed. People displayed in 606 can have a representative photo or simply a name. Events displayed in area 608 would display the event name, date, and location along with photos, videos and social media posts from the event. Eras displayed in area 610 would be listed according to the user's preference or as organized by the system. Themes displayed in area 612 would be listed according to the user's preferences or as organized by the system. Times displayed in area 614 would be displayed using a timeline histogram or other graphic representations. Locations would be displayed in area 615 using a map location display. Maps could be manually moved North, South, East or West or could be zoomed in or out using buttons 617. Any of the above areas for displaying associations for the selected song can be omitted, removed, or may not be present. Selecting any of the associations or songs presented would bring the user to the Association Display Screen or Music Display Screen for the selected association or song.

As described above, the "Music Display Screen" 600 may or may not contain buttons that activate the "Link Generation System" 212 (FIG. 3B) to allow the user to create a new link from the "Music Display Screen" 600. Associations linked to the music node via personally generated links may be displayed on the screen. Photos may be included when appropriate. In one variation, photos of "people" nodes may be displayed horizontally allowing the user to swipe left or right to view all people. In one variation, Events names may be displayed along with photos and social media posts below displayed horizontally allowing the user to swipe left or right to all photos. In variation, Eras may be listed chronologically or as selected by the user. In one variation, emotions may be listed alphabetically or as selected by the user. In one variation, themes may be listed alphabetically, based on frequency of use, or as selected by the user. In one variation, places may be displayed graphically on an imbedded map (see "Map Display" 615) or listed alphabetically, or as selected by the user. In one variation, the "Timeline" 614 display may be imbedded in the "Music Display Screen" 600. An edit function may or may not be included to allow users to change the arrangement or to remove certain associations as desired. Other organizations or arrangements can be conceived of and are included in this patent.

"Timelines" 614 include a graphic representation of the timing and frequency the song in question is heard. In one variation, a histogram may show the number of times the selected song was heard over a 2-3 day period. Events may or may not also be displayed on the "Timeline" 614. Other algorithms for displaying frequency in which the song was heard can be conceived of and are included in this patent.

"Map Display" 615 provides a graphic display of a map of a region of the world with locations in which the song was played marked visually. This could include a "pin", an "X" or any other marker that might be conceived of. Selecting the mark may or may not display additional information about the selected instance the song was heard. This may include one or more of the following: the name of the location, the date/time the song was heard, the event where the song was heard, social media posts, any other information pertaining to a specific instance in which the song was heard, and/or any combinations thereof. Other details about the instance in question could similarly be conceived of and are included in this patent.

Turning now to FIGS. 5A-5F, the "Association Display Screens" 500 are available for all categories associations including, but not limited to people, places, events, eras, emotions, and/or themes. Each category will display relevant nodes including, but not limited to songs. Each display screen may have options available to add links or rearrange the order of items displayed.

The "Person Display Screen" 500*a* may, or may not, display one or more of the following: a picture, name, birthdate, events shared with the individual, music shared with the individual, music linked to the individual as created by the user's own "Link Generation System" 212, and/or emotions associated with the person. Other data relevant to the person in question can be conceived of and is included in the patent. The top of Person Display Screen 500*a* has information about the person in area 501*a* including, but not limited to a representative photo, avatar, or other graphical representation of the person, their name, and/or birth date. The user can choose to listen the selected person's DJ-Stream by tapping button 502*a*. The user can choose to text or call the person using buttons 504*a* and 505*a* respectively. Control buttons 503*a* are used to play the songs associated with the person. Similarly, the user can use button 507*a* to add the list of songs to their Personal DJ-Stream. Button 508*a* can be used to post the Screen or select portions of the screen to a selected social media program. Details of the person displayed in area 501*a* can be edited using button 509*a*. Areas 510*a*, 512*a*, 514*a*, 516*a* and 518*a* can display shared events, photos/videos, emotions, shared eras, and music associated with the selected person respectively. These areas can be edited using buttons 511*a*, 513*a*, 515*a*, 517*a*, and/or 519*a* to add a new association or delete a current one. Shared events in area 510*a* can contain photos, videos, social media posts, or other associations to the event. The photos/videos area 512*a* would display photos and videos associated with the selected person. Emotions, Eras, and Music would be listed either according to the user's preferences or as organized by the system. Any of the above areas for displaying associations for the selected song can be omitted, removed, or may not be present. Selecting any of the associations or songs presented would bring the user to the Association Display Screen or Music Display Screen for the selected association or song.

The "Event Display Screen" 500*b* may, or may not, display one or more of the following: a representative photo, a name, a start time/date, and end time/date, a location, photos from the event, a list of people who attended the event, a list of music from the event, social media posts about the event, social media posts during the event, and/or a list of feelings about the event. Other data relevant to the event in question can be conceived of and is included in the patent. Area 501*b* is analogous to area 501*a* and allows the user to play associated music (502*b*), invite other to join the event (503*b*), stream music from the event on the Self-DJ system (504*b*) and/or post to social media (505*b*). Details of the Event can be edited using button 506*b*. Areas 507*b*-510*b* are used to display the events attendees, photos/videos, social media posts, and music respectively. Associations can be added or deleted using buttons 511*b*-514*b*. Any of the above areas for displaying associations for the selected song can be omitted, removed, or may not be present. Selecting any of the associations or songs presented would bring the user to the Association Display Screen or Music Display Screen for the selected association or song.

The "Era Display Screen" 500c may or may not display one or more of the following: a representative photo, a name, a non-specific time period, a location, photos, people who share the specific era node, a list of music from the era, social media posts about the era, social media posts during the era, and/or a list of feelings about the era. Other data relevant to the era in question can be conceived of and is included in the patent. Area 501c is analogous to area 501b and allows users to play associated music (502c), invite others to join the share the era (504c), stream music from the era on the Self-DJ system (505c) and/or post to social media (506c). In addition, button 503c would activate the Music List Generation System (Shared) so as to allow the user could search for common associations to the era selected. Details of the Event can be edited using button 507a. Areas 508c-511c are used to display people with whom the era is shared, photos/videos from the era, social media posts from the era, and music associated with the era respectively. Associations can be added or deleted using buttons 512c-515c. Any of the above areas for displaying associations for the selected song can be omitted, removed, or may not be present. Selecting any of the associations or songs presented would bring the user to the Association Display Screen or Music Display Screen for the selected association or song.

The "Place Display Screen" 500d may or may not display one or more of the following: a representative photo, a name, a map of the location, a list of people who share the location node, a list of music linked to the location node, social media posts about the location, and/or a list of feelings about the location. Other data relevant to the place in question can be conceived of and is included in the patent. Area 501d is analogous to area 501a and allows users to play associated music (502d), invite others to share the place (503d), stream music associated with the place on the Self-DJ system (504d), and/or post to social media (505d). Details of the Place can be edited using button 513d. Areas 506d-509d are used to display events, people with whom the place is shared, music associated with the place, and a map function. Associations can be added or deleted using buttons 510d-512d. Any of the above areas for displaying associations for the selected song can be omitted, removed, or may not be present. Selecting any of the associations or songs presented would bring the user to the Association Display Screen or Music Display Screen for the selected association or song.

The "Theme Display Screen" 500e may or may not display one or more of the following: a representative photo, an icon, a name, photos, and/or list of music linked to the emotion as created by the user's personal "Link Generation System" 212. Other data relevant to the theme in question can be conceived of and is included in the patent. Area 501e is analogous to area 501d and allows the users to play associated music (502e), view commonly associated songs via the Music List Generation System (Shared) (503e), invite others to share the theme (504d), stream music associated with the theme on the Self-DJ system (505d), and/or post to social media (506e). Details of the theme can be edited using button 507e. Areas 508e-511e are used to display people with whom the theme is shared, photos/videos associated with the theme, social media posts about the theme, and music associated with the theme. Associations can be added or deleted using buttons 512e-515e. Any of the above areas for displaying associations for the selected song can be omitted, removed, or may not be present. Selecting any of the associations or songs presented would bring the user to the Association Display Screen or Music Display Screen for the selected association or song.

The "Emotion Display Screen" 500f may or may not display one or more of the following: a representative photo, an icon, a name, photos, and/or a list of music linked to the emotion as created by the user's personal "Link Generation System" 212. Other data relevant to the emotion in question can be conceived of and is included in the patent. Area 501f is analogous to area 501e and allows the user to play associated music (502f), view commonly associated songs via the Music List Generation System (Shared) (503f), invite others to share the theme (504f), stream music associated with the theme on the Self-DJ system (505f), and/or post to social media (506f). Details of the theme can be edited using button 507f. Areas 508f-511f are used to display people with whom the theme is shared, photos/videos associated with the theme, social media posts about the theme, and music associated with the theme respectively. Associations can be added or deleted using buttons 512f-515f. Any of the above areas for displaying associations for the selected song can be omitted, removed, or may not be present. Selecting any of the associations or songs presented would bring the user to the Association Display Screen or Music Display Screen for the selected association or song.

Figure 7:
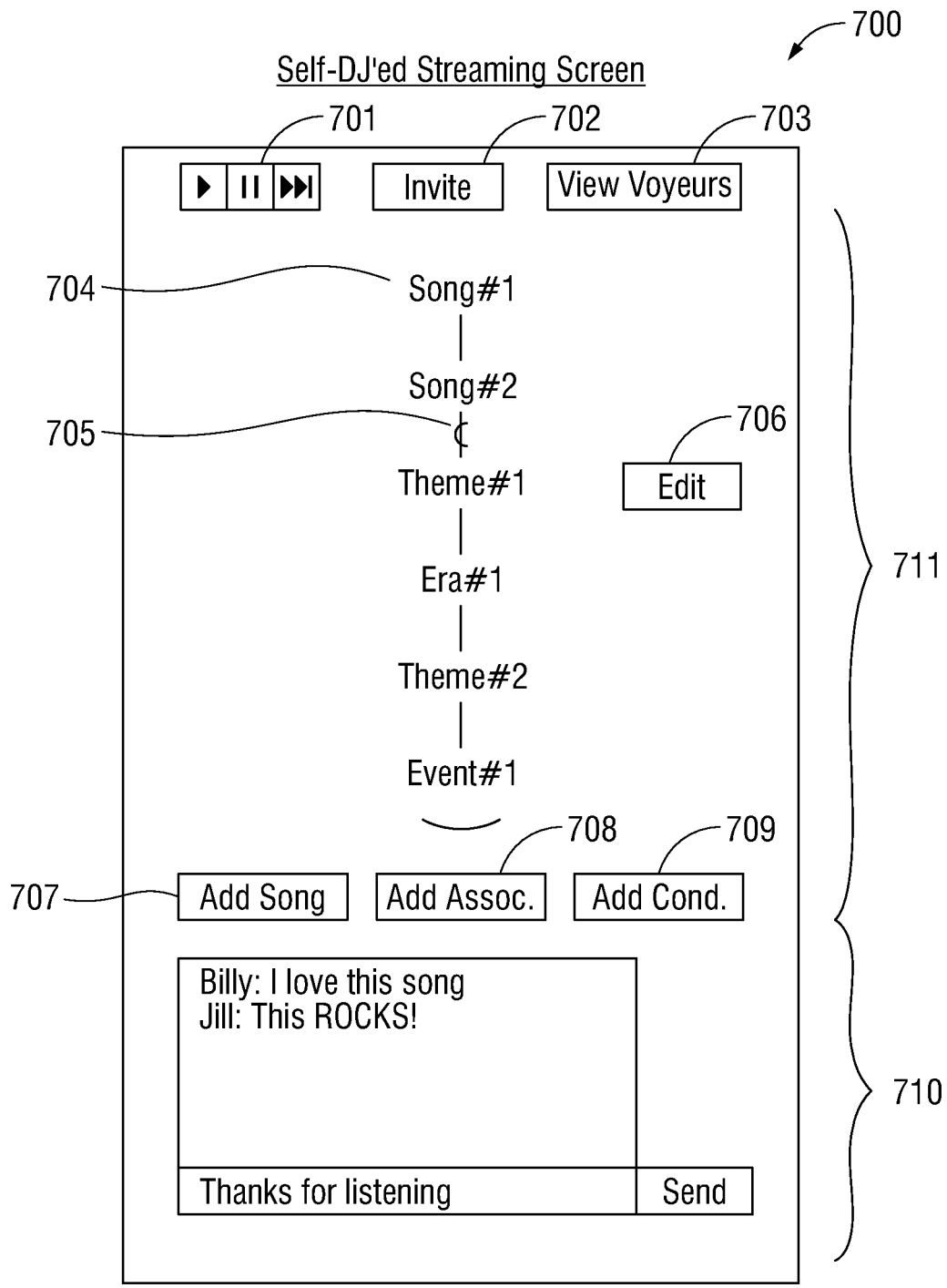
FIG. 7 is an example graphical user interface according to the present disclosure.

Turning now to FIG. 7, FIG. 7 is an example graphical user interface of a remote device 110 of artistic media system 100 illustrating a Self-DJ'ed Streaming Screen 700. Screen 700 interfaces with the Queue Generation System 701 and Queue Reading system 702 (See FIG. 3B and FIG. 10). Songs, Associations, and Conditionals are added the Queue using buttons 707, 708, and 709 respectively. Controls 701 are used to start, pause, and fast forward the stream. Button 702 is used to invite other users to the stream, and button 703 displays all the users who are currently listening to the stream. Area 711 displays the Queue in which the song 703 is the one being played or about to be played. Songs and selected associations are displayed on screen 700. 705 is graphic representation of Conditional which must be met before the stream can continue down the queue. Button 706 can be used to edit the order of the queue or remove items. There exists an area 710 for written communication between individuals listening to the stream similar to a texting feature or Instant Massager. Clients on other devices, either within the same network or different network can access the media stream to listen in real-time.

Turning now to FIG. 8, FIG. 8 is an example graphical user interface of a remote device 110 of artistic media system 100 illustrating a Randomized Streaming System using a "Check and Slider" system 803 shown as screen 800. Area 801 displays the current song being played by the system. Button 802 can be used to view the Music Display Screen for the current song being played. Buttons in area 803c allow users to add associations to the current song. Control buttons 804 allow the user to play, pause, or fast forward the stream. Area 805 contains a variety of broad categories of music which may include genres or specific associations. A box next to each can be checked, "x"ed or left blank. Check Box Categories can be added or subtracted using button 807. Area 806 contains a variety of sliders which allow for fine-tuning the music selection. Button 808 can be used to add or delete sliders. Music selected by the Random Streaming System would be chosen in accordance with the variables determined by the checks and sliders. Clients on other devices, either within the same network or different network can access the media stream to listen in real-time.

Turning now to FIG. 9, FIG. 9 is an example graphical user interface of a remote device 110 of artistic media system 100 illustrating a Music Voyeur System 900, illustrated as screen 900a. Using button 901 the user can choose from a list of music streams that are available to them. The current stream being followed is displayed in area 902 and the songs in 903. A chat/text system is available to all listeners of the selected stream in area 904.

Figure 10:
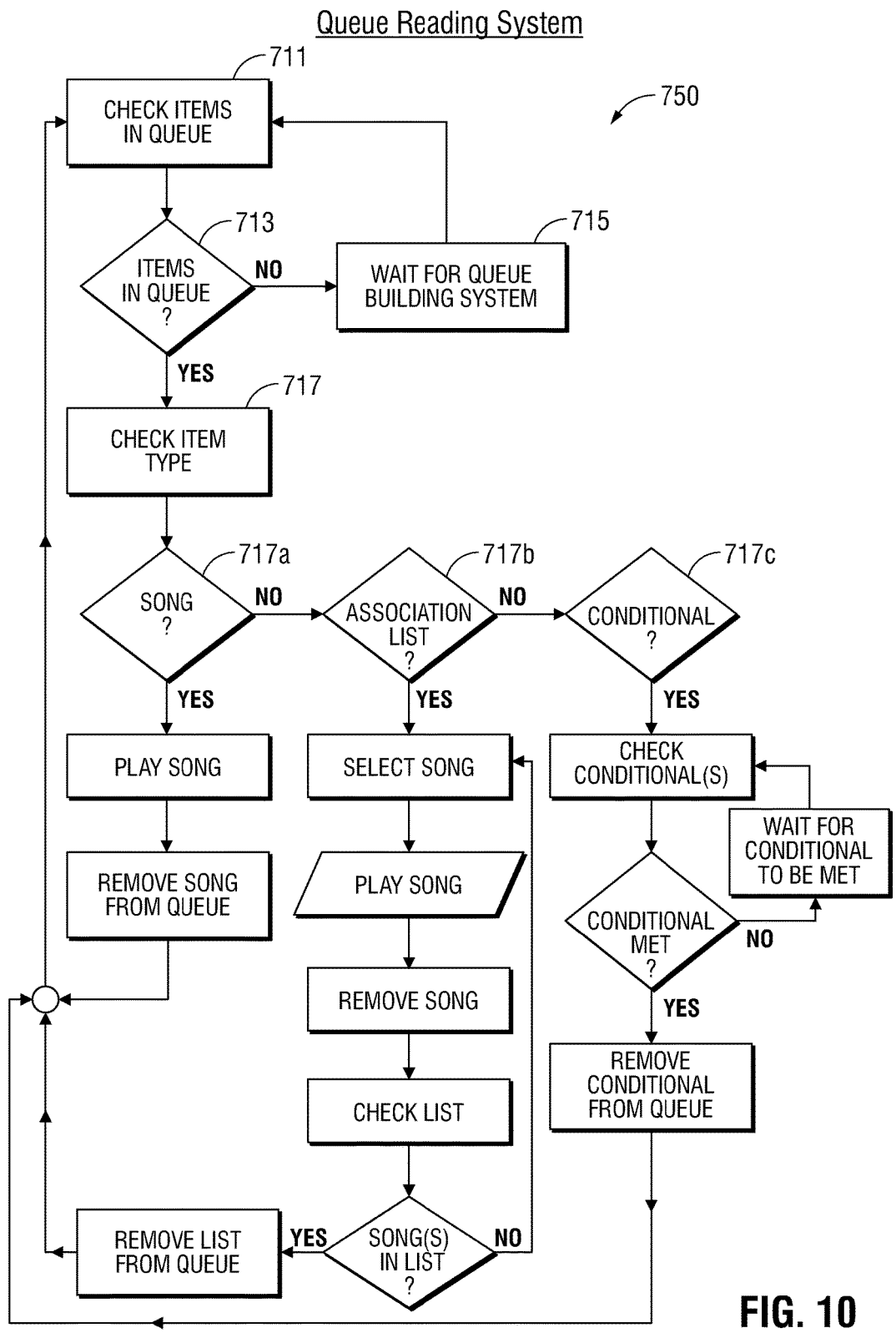
FIG. 10 is an example method according to the present disclosure.

Turning now to FIG. 10, and referring back to FIG. 7, the "Queue Reading System" 702 consists of a system and method for reading the information within the Queue and playing songs when indicated. This may be achieved using a multitude of methods with similar results. In one exemplary method, illustrated as method 705, the Queue is first checked to see if it contains any items (step 711). If no items are present (no in step 713) then the system waits for the "Queue Building System" 701 to add items to the Queue (step 715). If items are present in the Queue (yes in step 713) then the system determines the type of item that is present (step 717).

If the first item in the Queue is a song (yes in step 717a), then the song is played by the system. After it is finished or fast forwarded, then the song is removed from the Queue and the Queue is rechecked for additional items. If the first item in the Queue is not a song (no in step 717a), then method 705 proceeds to step 717b.

If the first item in the Queue is an "Association List" (yes in step 717b) then one of the songs in the list is selected and played by the system. Songs may be selected at random (Shuffle Mode) or sequentially. Once a song is played or fast forwarded, then the song is removed from the "Association List" and the List is rechecked for additional songs. When the "Association List" is empty, the Queue is rechecked for additional items. If the first item in the Queue is not an "Association List" (no in step 717b), then method 705 proceeds to step 717c.

If the first item in the Queue is a Conditional (yes in step 717c), then the system checks to see if the conditional(s) has been met. If the conditional(s) has/have not been met then then the system waits for the conditionals to be met. This may involve a variety of approaches such as rechecking after a period of time, or awaiting for a separate or contained system to signal that the Conditionals have been met. Other methods can be conceived of and are included in the patent. Once the Conditional(s) has/have been met, it/they are removed from the Queue and the Queue is rechecked for additional items.

The systems and methods according to the present disclosure provide structures and methodologies by which the user can access the music stream of others. When connected, the user can see the list of songs in the queue and the transition conditionals. A text function allows the user to communicate with others connected to the same music stream. The systems/methods record locally or remotely which songs were listened to and at what time. Similarly, song lists can be easily imported into the user's database of associations. Personal associations and cognitive links can also be added as described above.

It will be appreciated that features of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Although specific terms are employed herein, they are used in a generic and descriptive sense only and not for purposes of limitation.

The term "system," as used herein, may include modules, software and/or hardware, digital or analog, that cooperate to perform one or more control tasks and may include digital commands, power circuitry, networking hardware, an/or a set of programmable instructions for implementation and execution by at least one processor, or central processing unit, to carry out any of the steps described herein. The processor may be any type of controller or processor, and may be embodied as one or more controllers or processors adapted to perform the functionality discussed herein. Additionally, as the term processor is used herein, a processor may include use of a single integrated circuit (IC), or may include use of a plurality of integrated circuits or other components connected, arranged or grouped together, such as controllers, microprocessors, digital signal processors, parallel processors, multiple core processors, custom ICs, application specific integrated circuits, field programmable gate arrays, adaptive computing ICs, associated memory, such as and without limitation, RAM, DRAM and ROM, and other ICs and components.

Also included may be a database or storage unit including, but not limited to, repository, databank, database, cache, storage unit, cloud, and the like, a data repository, any computer or other machine-readable data storage medium, memory device or other storage or communication device for storage or communication of information, currently known or which becomes available in the future, including, but not limited to, a memory integrated circuit, or memory portion of an integrated circuit (such as the resident memory within a processor), whether volatile or non-volatile, whether removable or non-removable, including without limitation RAM, FLASH, DRAM, SDRAM, SRAM, MRAM, FeRAM, ROM, EPROM or E2PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment.

Additionally, or alternatively, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory may be adapted to store various look up tables, parameters, coefficients, other information and data, programs or instructions (of the software of the present disclosure), and other types of tables such as database tables.

The user interfaces described herein may be a web page corresponding to a website maintained by one or more computing devices (for example, the systems described herein), such as a data collection server, or may be maintained locally within devices. The user interface screens described herein, may be accessible by users via a web browser, such as and without limitation Internet Explorer®, Firefox®, Chrome®, etc., and/or by an application stored/running locally on a device or system.

What is claimed is:

1. A method for cognitive association, the method comprising:
   tracking an output of media experienced at a specific event over time for a particular user;
   creating a list of media for the particular user based on the tracked output of media;
   obtaining associative data related to the specific event based on the media, the associative data including photos displayed at the specific event and videos played at the specific event;
   receiving an input of a particular media;
   outputting the particular media;
   outputting at least one of the associative data;
   suggesting cognitive links to the particular user based on the list of media for the particular user from the specific event;
   displaying the associative data and the particular media on a remote device; and
   displaying at least one element configured to adjust at least one smooth parameter of the user related to the associative data and the particular media.

2. The method according to claim 1, wherein the media includes at least one of a song, an image, or a video.

3. The method according to claim 1, further comprising receiving audio tones via a microphone and associating the received audio tones with the media.

4. The method according to claim 1, wherein the associative data is received from an external device.

5. The method according to claim 1, further comprising sharing the associative data with other users.

6. The method according to claim 1, the associative data further includes at least one of social media posts about the specific event or people present at the specific event.

7. A cognitive association media system comprising:
   a processor; and
   a memory storing instructions which, when executed by the processor, cause the cognitive association media system to:
   track an output of media experienced at a specific event over time for a particular user;
   create a list of media for the particular user based on the tracked output of media;
   obtain associative data related to the specific event based on the media, the associative data including photos displayed at the specific event and videos played at the specific event;
   receive an input of a particular media;
   output the particular media;
   output at least one of the associative data;
   suggest cognitive links to the particular user based on the list of media for the particular user from the specific event;
   display the associative data and the particular media on a remote device; and
   display at least one element configured to adjust at least one smooth parameter of the user related to the associative data and the particular media.

8. The system according to claim 7, wherein the media includes at least one of a song, an image, or a video.

9. The system according to claim 7, wherein the instructions, when executed by the processor, further cause the cognitive association media system to receive audio and associate the received audio with the media.

10. The system according to claim 7, wherein the associative data is received from an external device.

11. The system according to claim 7, wherein the instructions, when executed by the processor, further cause the cognitive association media system to share the associative data with other devices.

12. The system according to claim 7, the associative data further includes at least one of social media posts about the specific event or people present at the specific event.

13. A non-transitory computer-readable storage medium storing instructions which, when executed by a processor, cause a computer to:
   track an output of media experienced at a specific event over time for a particular user;
   create a list of media for the particular user based on the tracked output of media;
   obtain associative data related to the specific event based on the media, the associative data including photos displayed at the specific event and videos played at the specific event;
   receive an input of a particular media;
   output the particular media;
   output at least one of the associative data;
   suggest cognitive links to the particular user based on the list of media for the particular user from the specific event;
   display the associative data and the particular media on a remote device; and
   display at least one element configured to adjust at least one smooth parameter of the user related to the associative data and the particular media.

14. The non-transitory computer-readable storage medium according to claim 13, wherein the media includes at least one of a song, an image, or a video.

15. The non-transitory computer-readable storage medium according to claim 13, wherein the instructions, when executed by the processor, further cause the computer to receive audio tones via a microphone and associate the received audio tones with the media.

16. The non-transitory computer readable-storage medium according to claim 13, wherein the associative data is received from an external device.

* * * * *